US010389214B2

(12) United States Patent
Takenaka et al.

(10) Patent No.: US 10,389,214 B2
(45) Date of Patent: Aug. 20, 2019

(54) MOTOR AND PRODUCING METHOD FOR MOTOR

(71) Applicant: KABUSHIKI KAISHA YASKAWA DENKI, Kitakyushu-shi (JP)

(72) Inventors: Kunihiro Takenaka, Kitakyushu (JP); Hiroshi Katayama, Kitakyushu (JP); Kiyonori Koguma, Kitakyushu (JP); Yu Ujita, Kitakyushu (JP); Koji Nuki, Kitakyushu (JP); Yosuke Katsuki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 343 days.

(21) Appl. No.: 15/375,167

(22) Filed: Dec. 12, 2016

(65) Prior Publication Data

US 2017/0149310 A1     May 25, 2017

Related U.S. Application Data

(63) Continuation of application No. PCT/JP2015/082737, filed on Nov. 20, 2015.

(51) Int. Cl.
*H02K 11/33*     (2016.01)
*H02K 5/22*     (2006.01)
(Continued)

(52) U.S. Cl.
CPC ............ *H02K 11/33* (2016.01); *H02K 5/225* (2013.01); *H02K 9/02* (2013.01); *H02K 9/22* (2013.01); *H02K 15/14* (2013.01)

(58) Field of Classification Search
CPC ............ H02K 15/14; H02K 5/22; H02K 9/02; H02K 11/33; H02K 5/225; H02K 9/22
(Continued)

(56) References Cited

U.S. PATENT DOCUMENTS 5,912,541 A * 6/1999 Bigler .................. H02K 11/215
318/538
2002/0060105 A1 * 5/2002 Tominaga ............ B62D 5/0406
180/443

(Continued)

FOREIGN PATENT DOCUMENTS

DE     102005032967     1/2007
JP     60-141148     7/1985
(Continued)

OTHER PUBLICATIONS

EPO machine translation of JP2015202049, all pages, Oct. 2015 (Year: 2015).*
(Continued)

*Primary Examiner* — Naishadh N Desai
(74) *Attorney, Agent, or Firm* — Mori & Ward, LLP

(57) ABSTRACT

A motor includes a motor part and an amplifier configured to supply electric power to the motor part. The motor part includes a stator and a rotor. The amplifier includes a first frame constituting a housing of the amplifier and a second frame. The second frame is arranged on a first face located in a direction perpendicular to a rotation axis direction of the rotor at the first frame. At least one substrate housed in the first frame is attached to the second frame.

12 Claims, 13 Drawing Sheets

(51) Int. Cl.
*H02K 9/02* (2006.01)
*H02K 15/14* (2006.01)
*H02K 9/22* (2006.01)

(58) Field of Classification Search
USPC .......................................................... 310/89
See application file for complete search history.

(56) References Cited

U.S. PATENT DOCUMENTS

| | | | |
|---|---|---|---|
| 2004/0174133 | A1 | 9/2004 | Miura et al. |
| 2012/0056572 | A1* | 3/2012 | Bigler .................... H02K 5/225 |
| | | | 318/570 |
| 2014/0009016 | A1 | 1/2014 | Seidenbinder et al. |
| 2014/0084755 | A1* | 3/2014 | Hamada .................. H02K 5/15 |
| | | | 310/432 |
| 2014/0339966 | A1 | 11/2014 | Tomizawa et al. |
| 2015/0333600 | A1* | 11/2015 | Nakano .................. H02K 29/08 |
| | | | 310/71 |

FOREIGN PATENT DOCUMENTS

| | | |
|---|---|---|
| JP | 11-313465 | 11/1999 |
| JP | 11313465 A * | 11/1999 |
| JP | 2004-274834 | 9/2004 |
| JP | 2015-202049 | 11/2015 |
| JP | 2015202049 A * | 11/2015 |
| WO | WO 2015/122069 | 8/2015 |

OTHER PUBLICATIONS

Chinese Office Action for corresponding CN Application No. 201580038607.1, dated Sep. 3, 2018.
Japanese Office Action for corresponding JP Application No. 2016-557342, dated Aug. 24, 2017.
International Search Report for corresponding International Application No. PCT/JP2015/082737, dated Feb. 2, 2016.
Written Opinion for corresponding International Application No. PCT/JP2015/082737, dated Feb. 2, 2016.
Extended European Search Report for corresponding EP Application No. 15892799.6-1201, dated May 16, 2019.

* cited by examiner

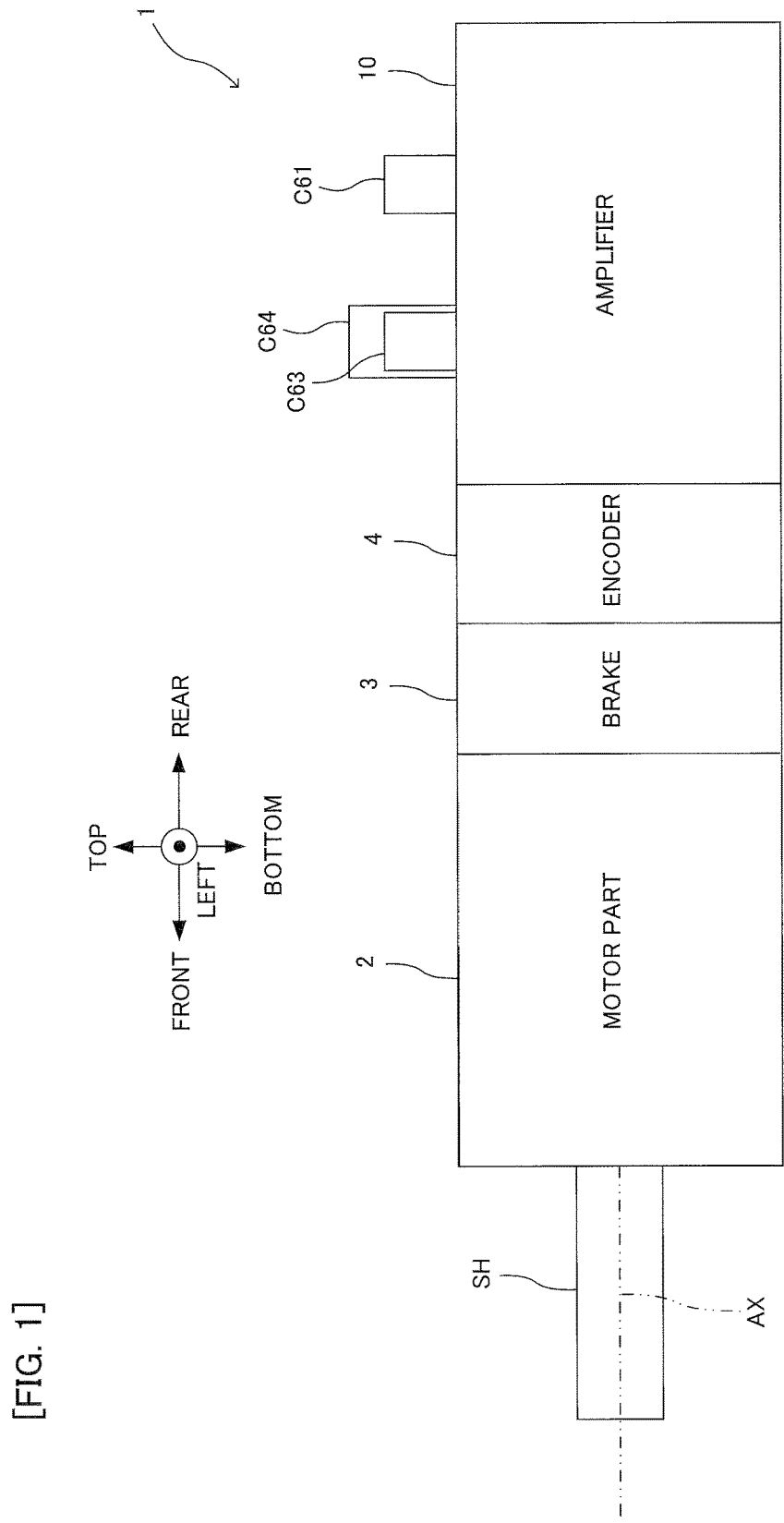

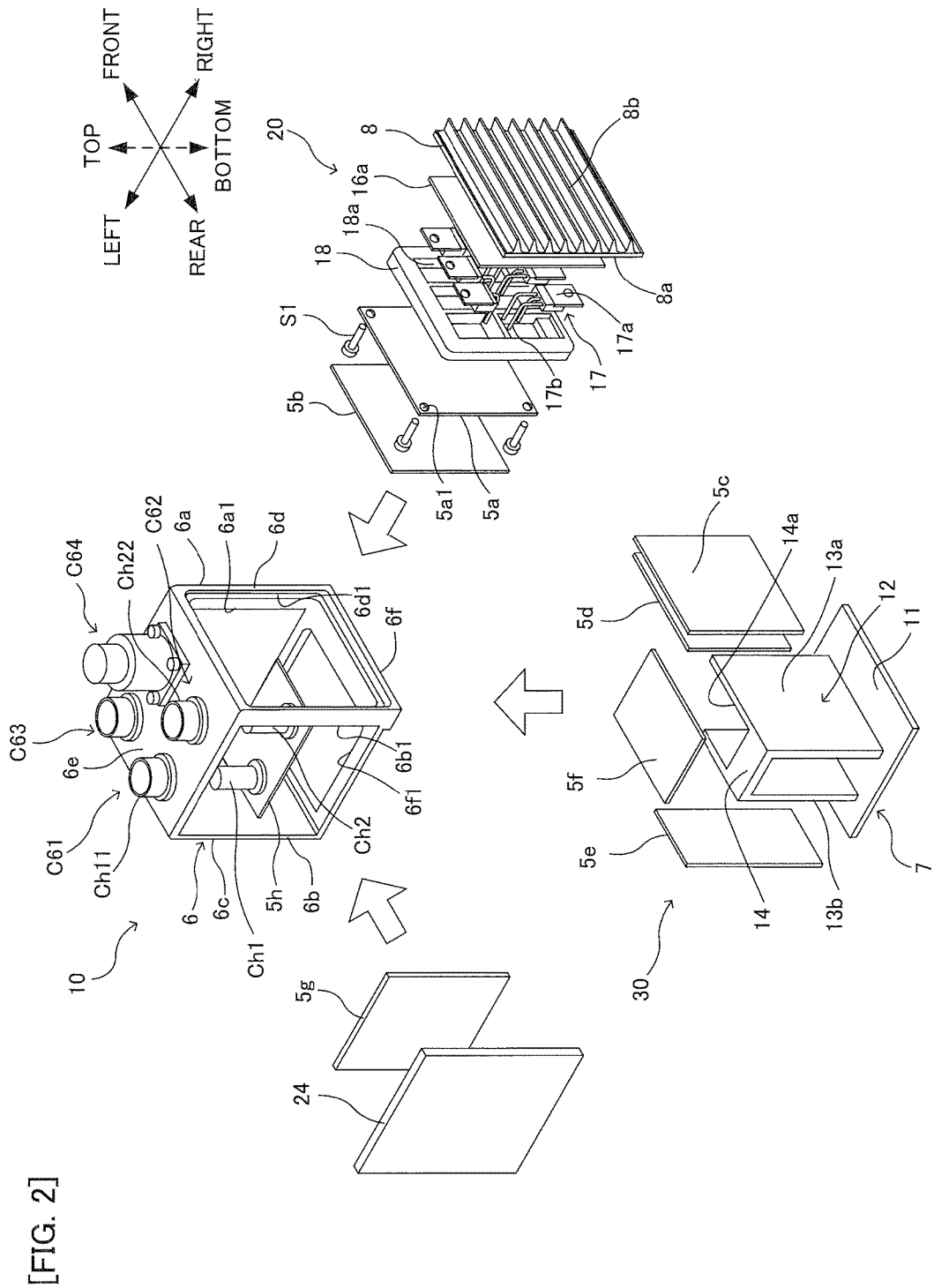
[FIG. 2]

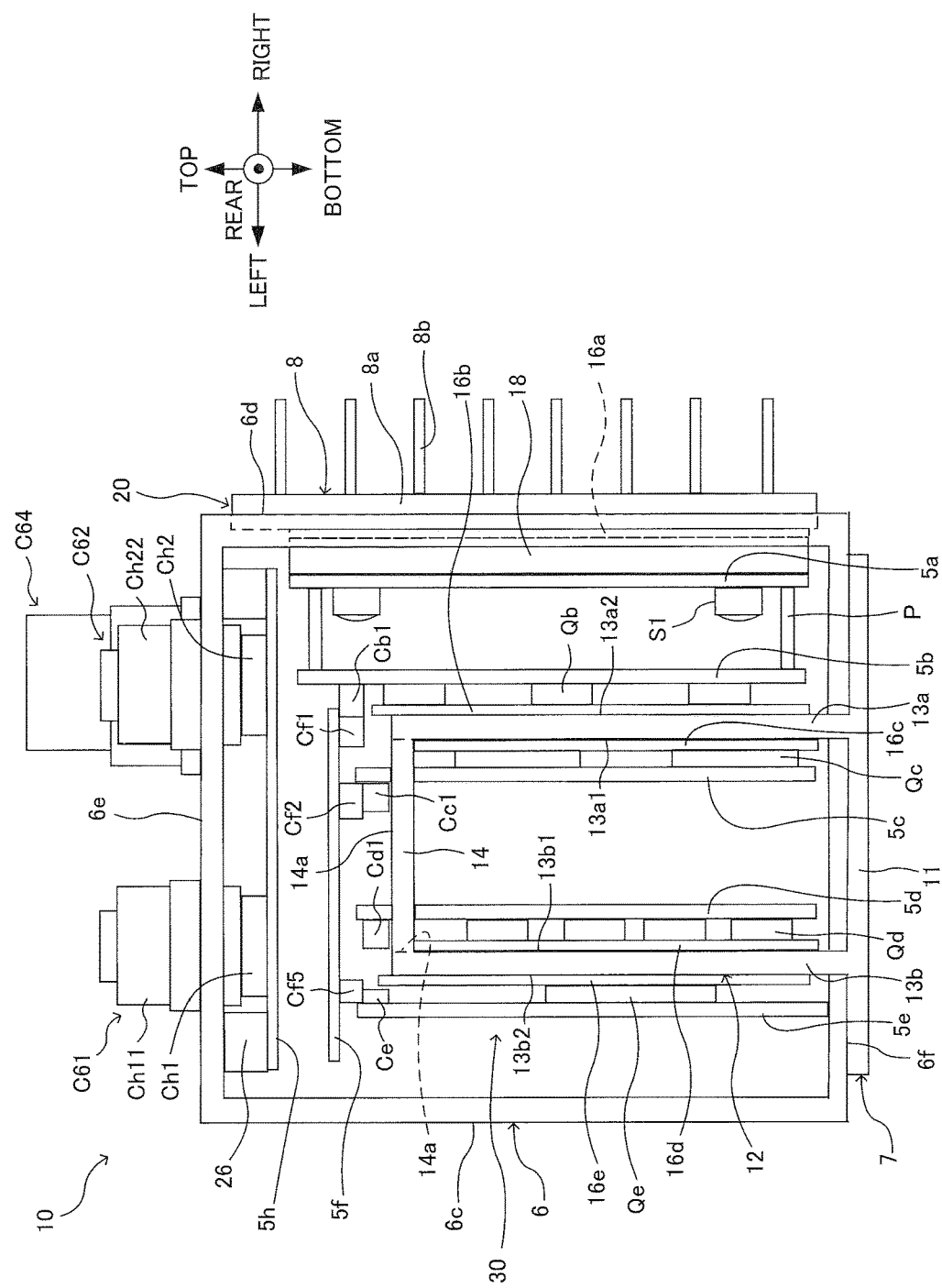
[FIG. 3]

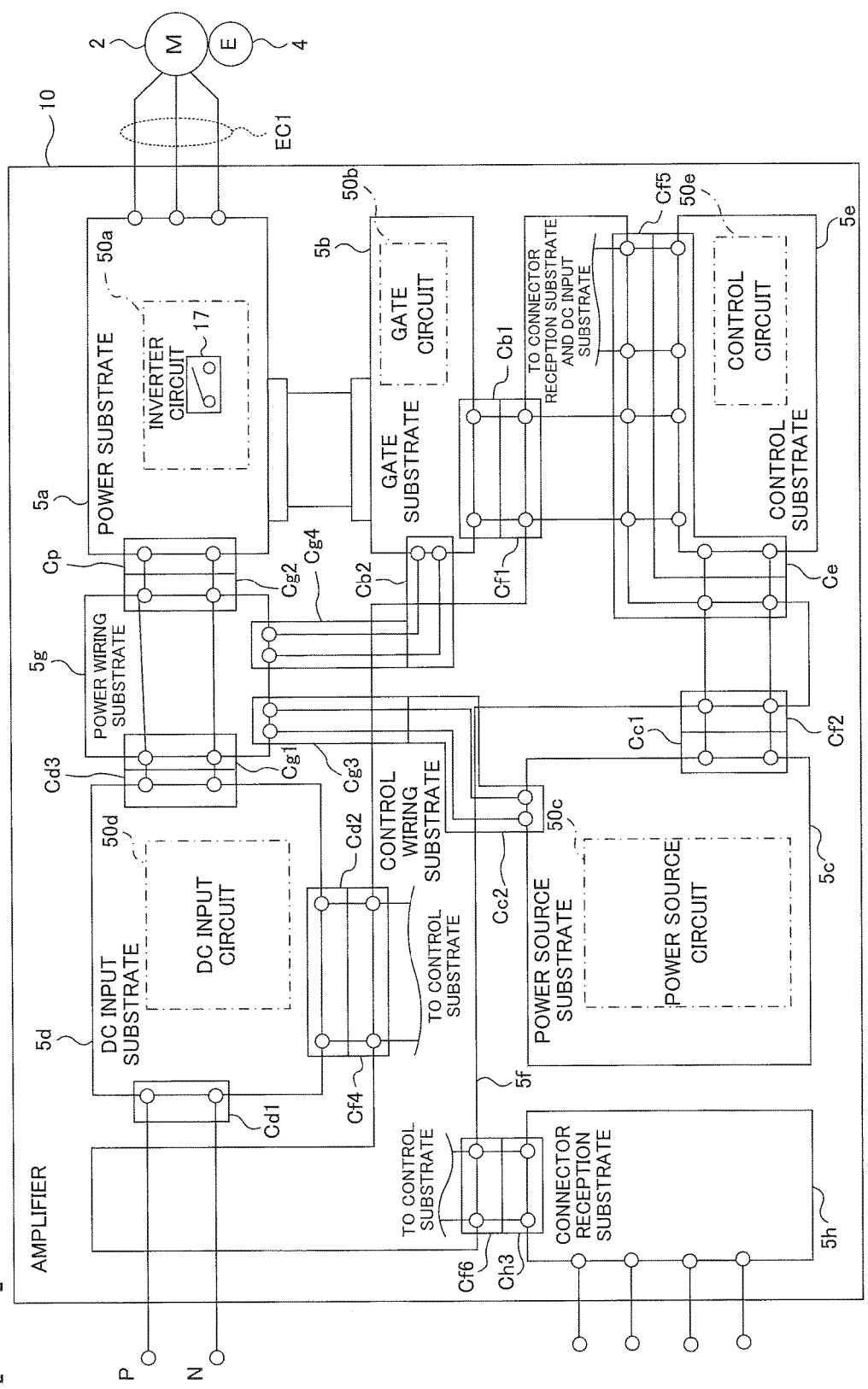
[FIG. 4]

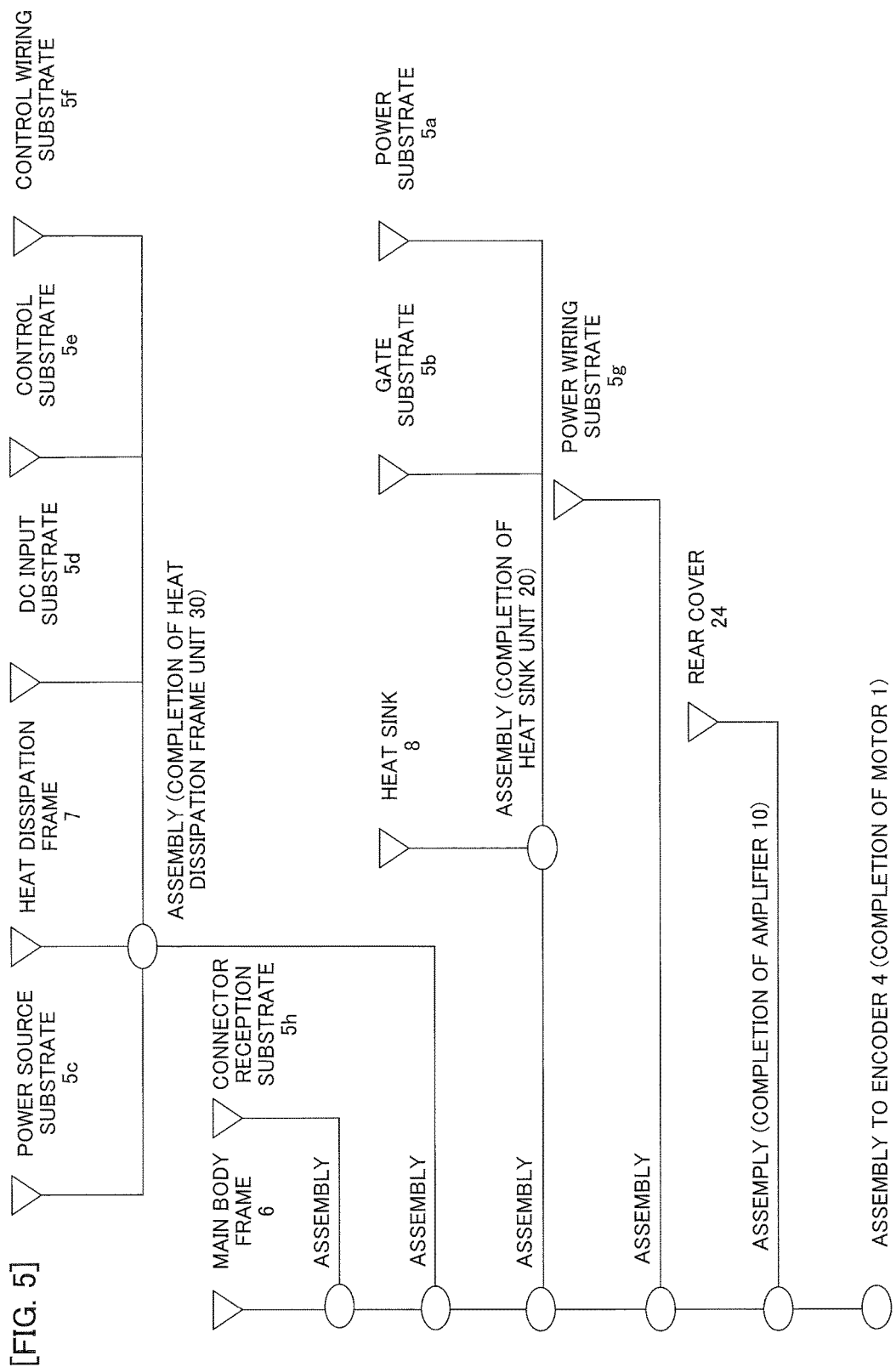

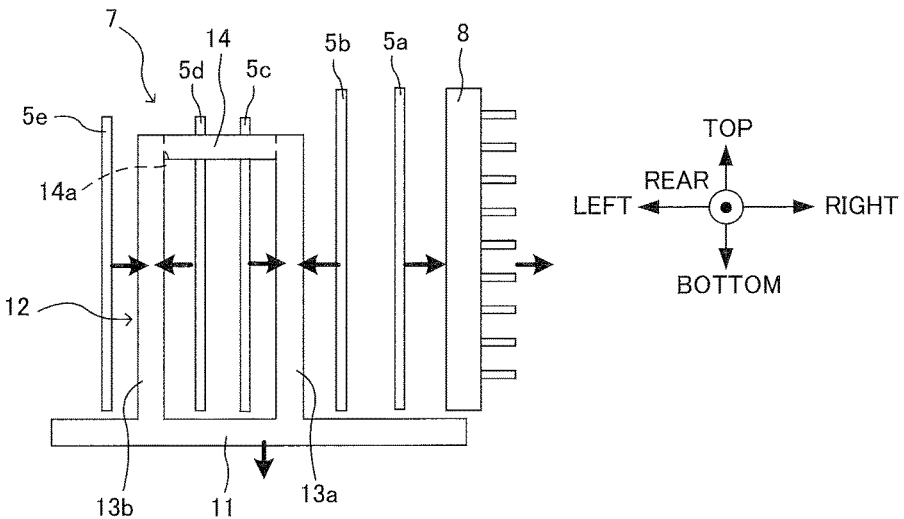
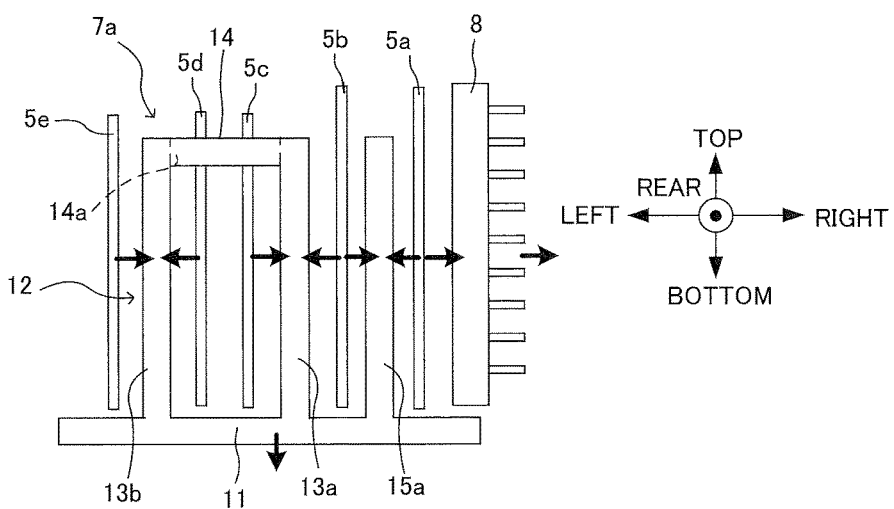
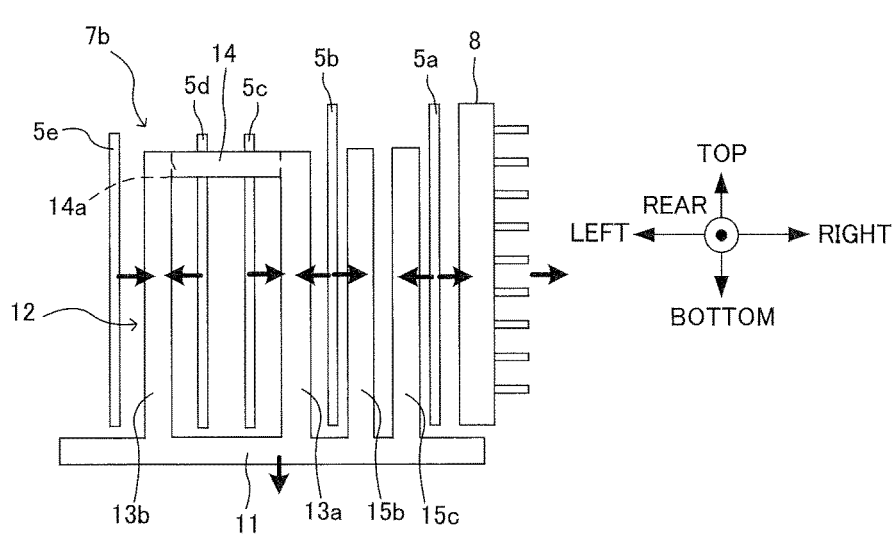

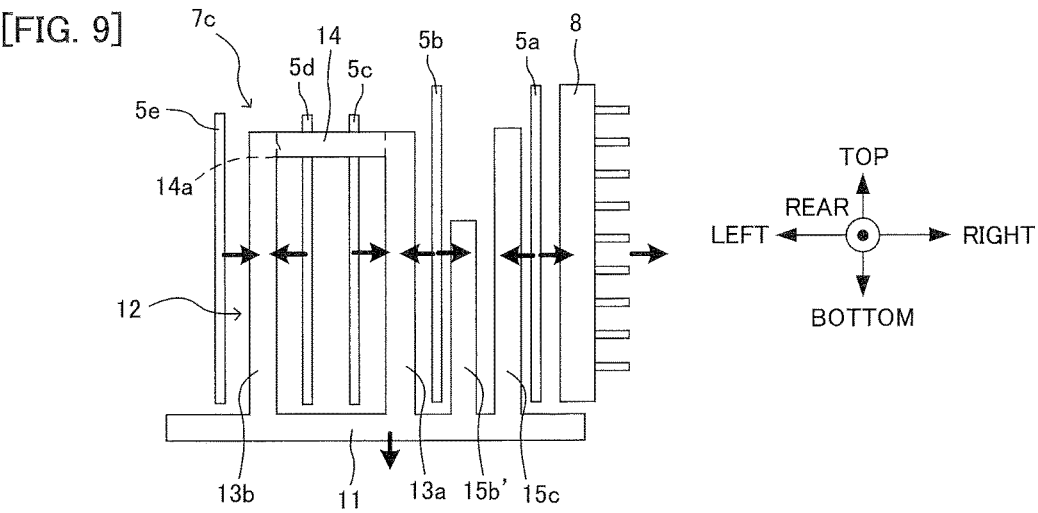
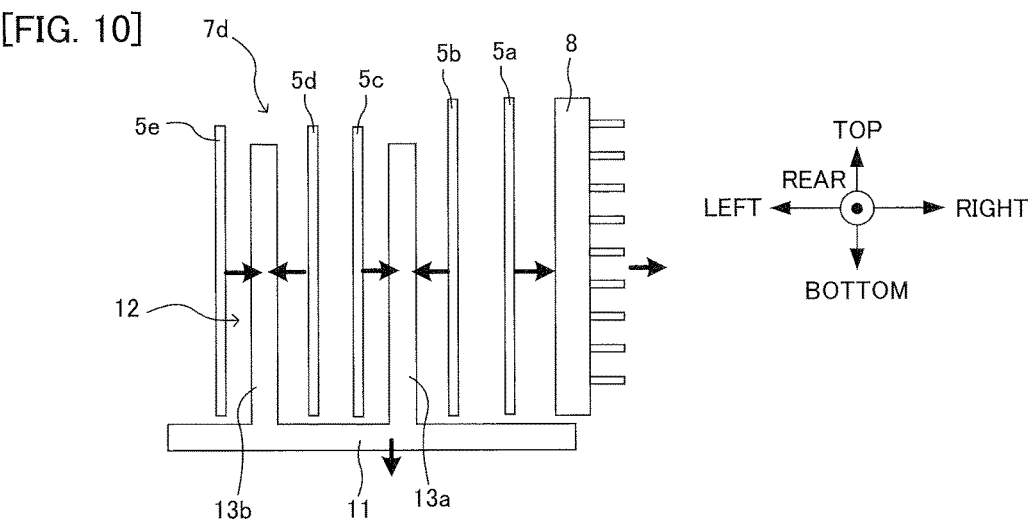
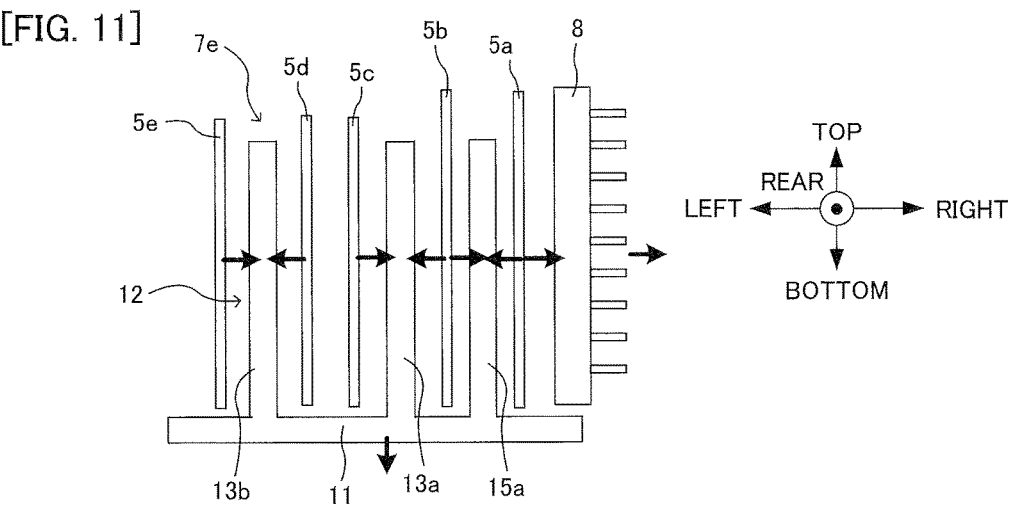

[FIG. 12]
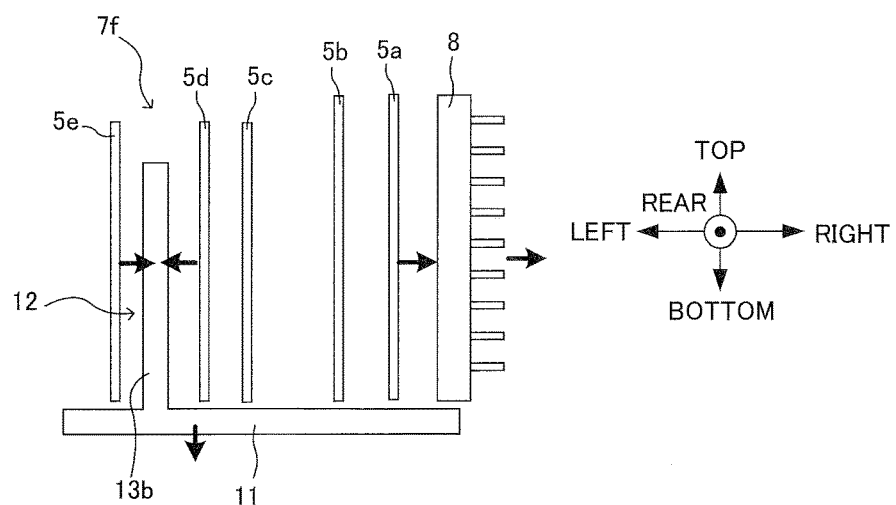
[FIG. 13]
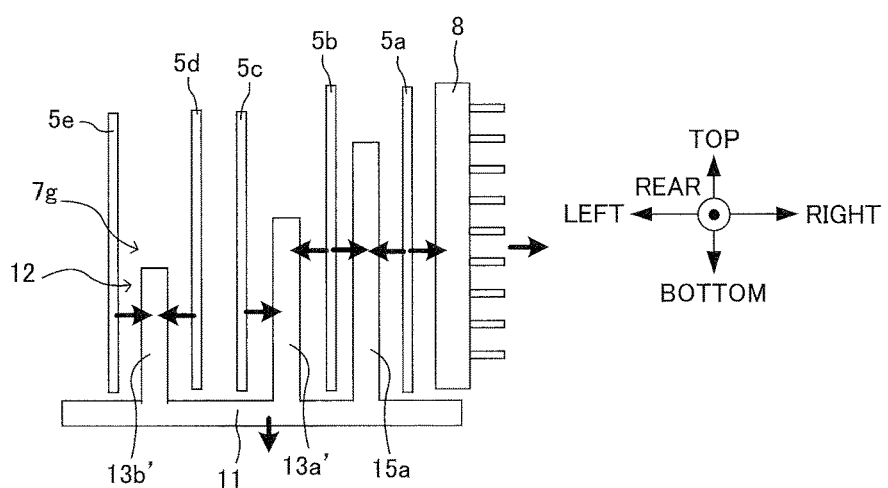
[FIG. 14]
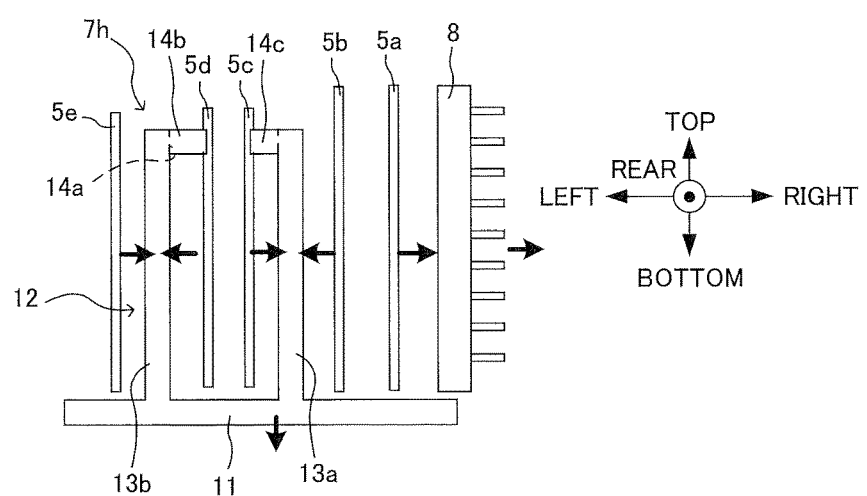

[FIG. 15]
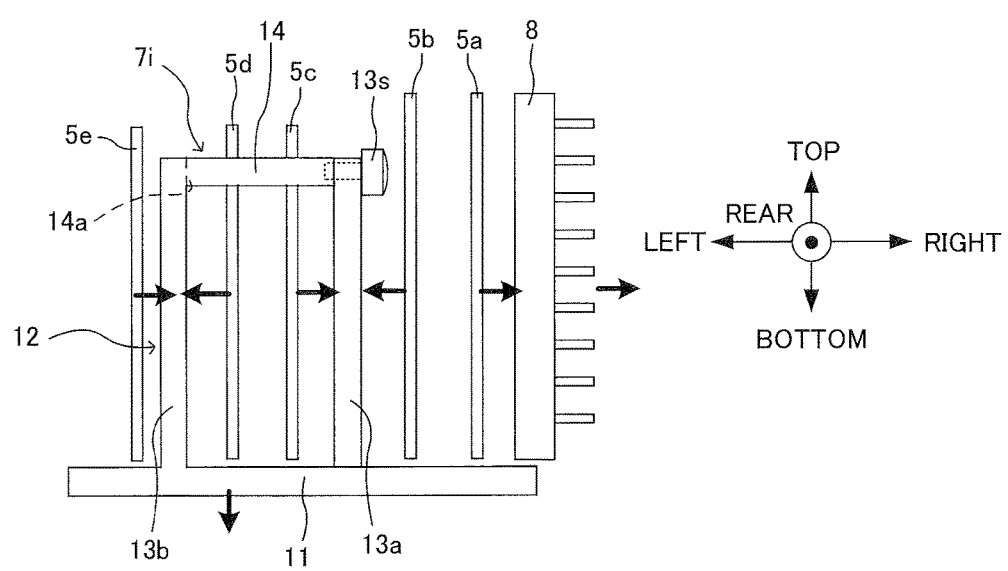

[FIG. 16]
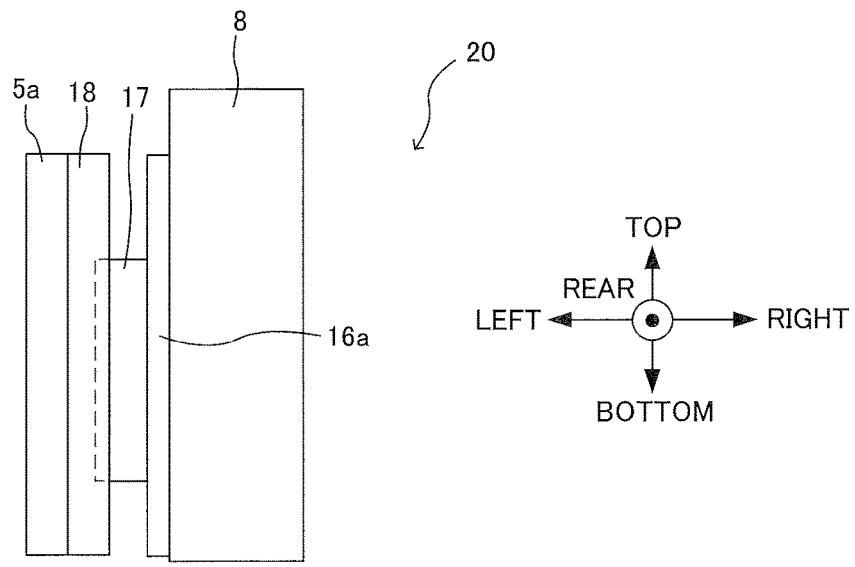
[FIG. 17]
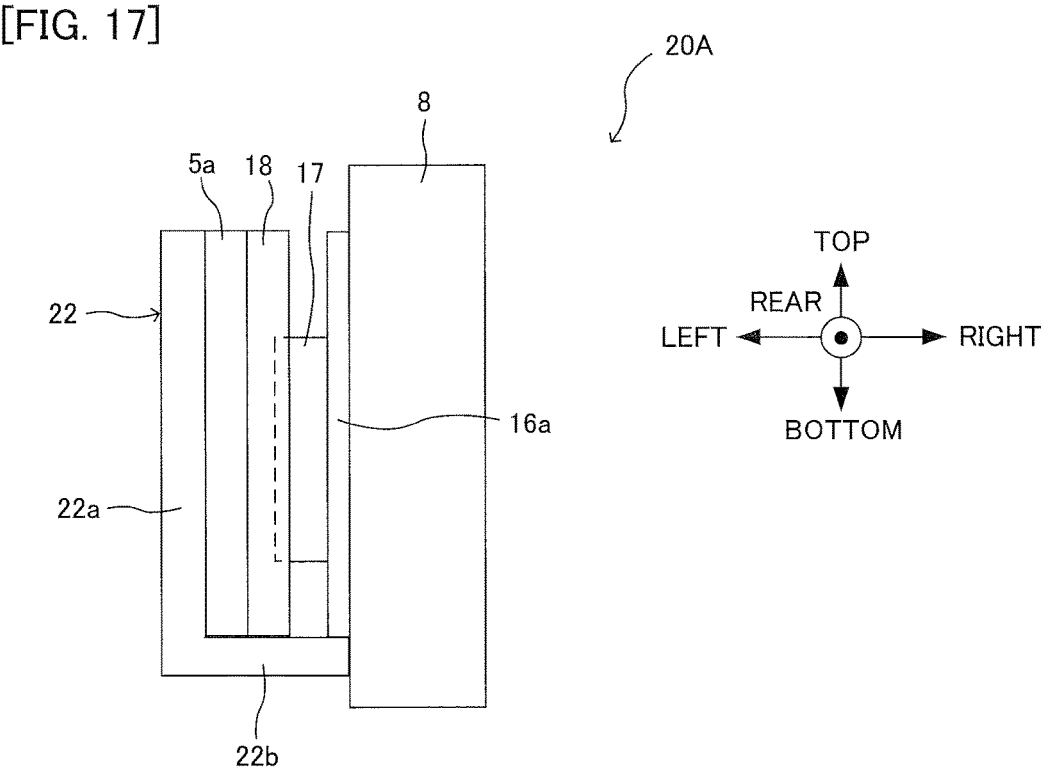

[FIG. 18]
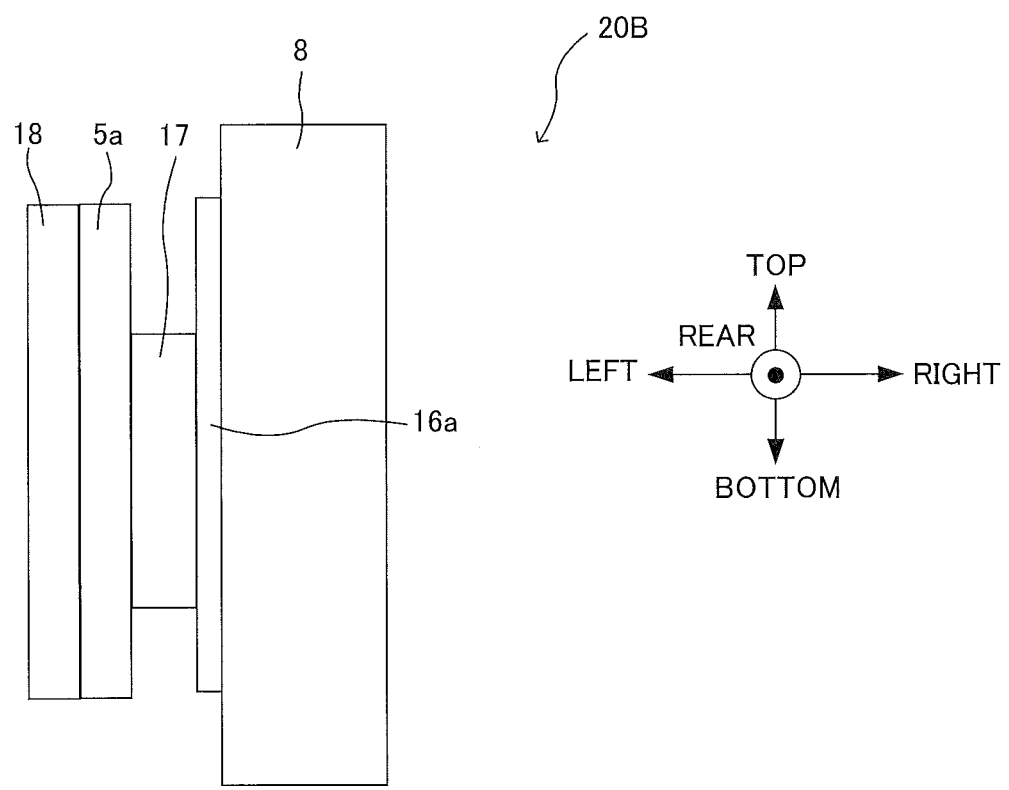

[FIG. 19]
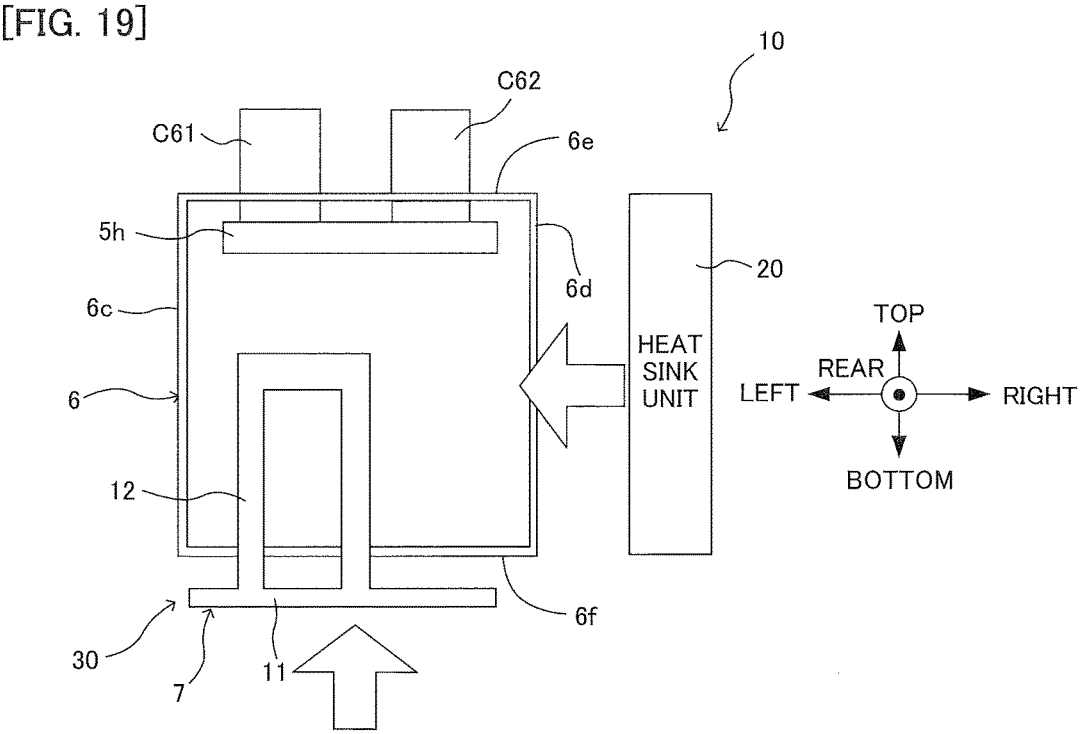
[FIG. 20]
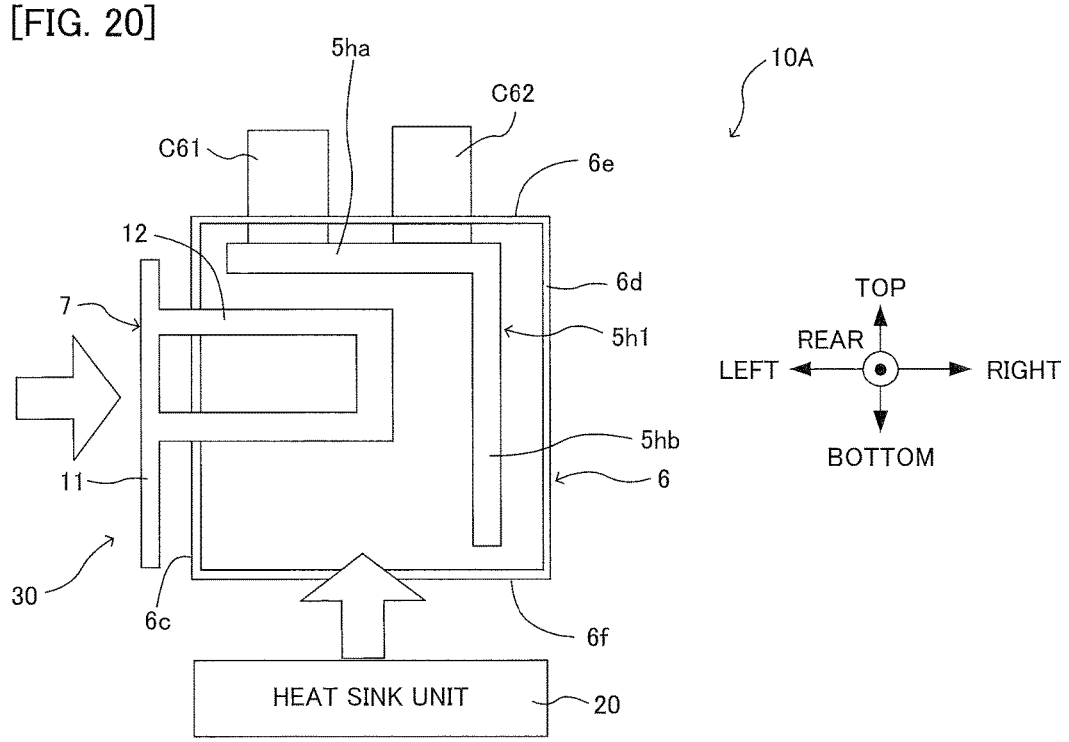

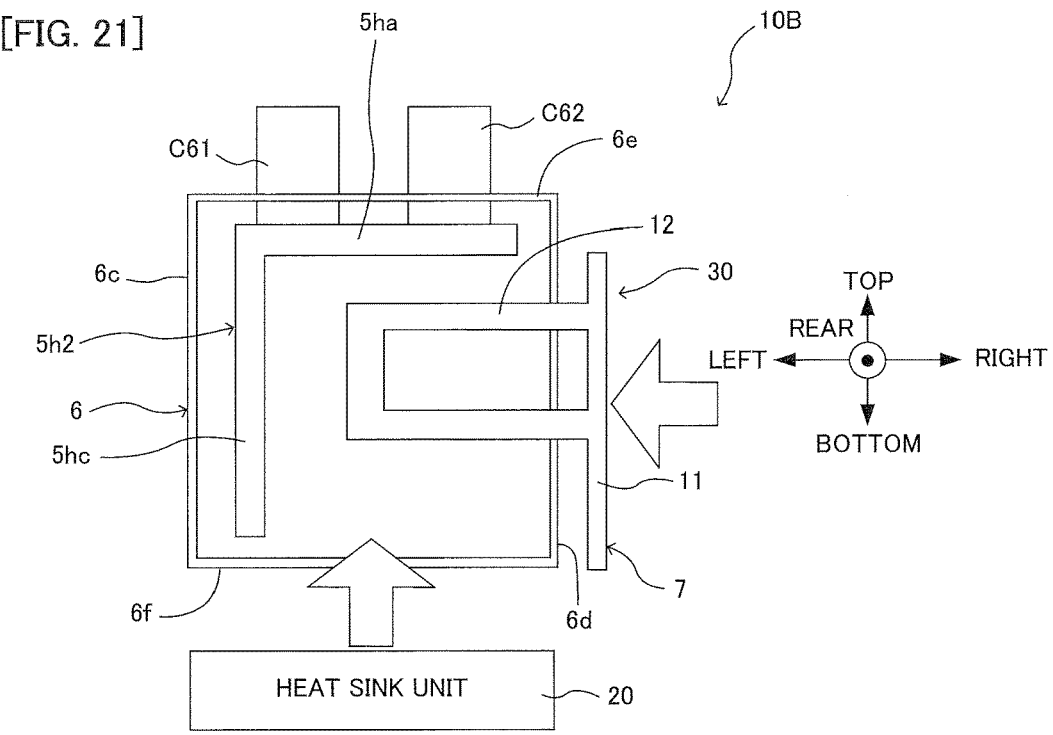
[FIG. 21]
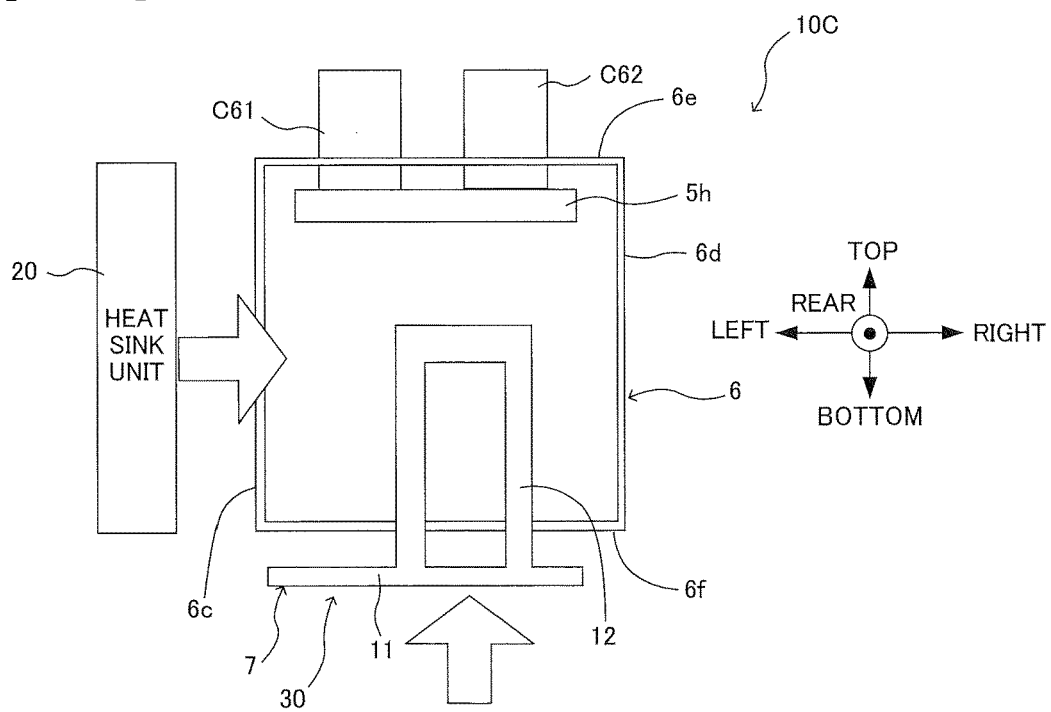
[FIG. 22]

US 10,389,214 B2

MOTOR AND PRODUCING METHOD FOR MOTOR

CROSS-REFERENCE TO RELATED APPLICATION

This is a continuation application of PCT/JP2015/082737, filed Nov. 20, 2015. The entire contents of this application are incorporated herein by reference.

BACKGROUND

Technical Field

Embodiments disclosed herein relate to a motor and a producing method for a motor.

Description of Background Art

A drive circuit built-in type servomotor may be configured by juxtaposing a motor drive substrate and a sensor circuit substrate in a sensor cover.

SUMMARY

According to one aspect of the present disclosure, a motor includes a motor part and an amplifier configured to supply electric power to the motor part. The motor part includes a stator and a rotor. The amplifier includes a first frame constituting a housing of the amplifier and a second frame. The second frame is arranged on a first face located in a direction perpendicular to a rotation axis direction of the rotor at the first frame. At least one substrate housed in the first frame is attached to the second frame.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a schematic side view showing an exemplary general configuration of a motor of an embodiment;

FIG. 2 is an exploded perspective view showing an exemplary configuration of an amplifier;

FIG. 3 is a rear view showing an exemplary configuration of an amplifier in the manner of seeing through a rear cover;

FIG. 4 is an explanatory view showing exemplary configuration of substrates and an exemplary connection relationship among the respective substrates;

FIG. 5 is a process chart showing an exemplary producing method for a motor;

FIG. 6 is a schematic view showing an exemplary configuration of a heat dissipation frame related to an embodiment;

FIG. 7 is a schematic view showing a first modified example of a heat dissipation frame;

FIG. 8 is a schematic view showing a second modified example of a heat dissipation frame;

FIG. 9 is a schematic view showing a third modified example of a heat dissipation frame;

FIG. 10 is a schematic view showing a fourth modified example of a heat dissipation frame;

FIG. 11 is a schematic view showing a fifth modified example of a heat dissipation frame;

FIG. 12 is a schematic view showing a sixth modified example of a heat dissipation frame;

FIG. 13 is a schematic view showing a seventh modified example of a heat dissipation frame;

FIG. 14 is a schematic view showing an eighth modified example of a heat dissipation frame;

FIG. 15 is a schematic view showing a ninth modified example of a heat dissipation frame;

FIG. 16 is a schematic view showing the configuration of a heat sink unit according to an embodiment;

FIG. 17 is a schematic view showing a modified example of a heat sink unit to which a frame connected to a heat sink is added;

FIG. 18 is a schematic view showing a modified example of a heat sink unit in which the position of a resin support is changed;

FIG. 19 is a schematic view showing positional relationship among respective components in an amplifier related to an embodiment;

FIG. 20 is a schematic view showing a first modified example of positional relationship among respective components in an amplifier;

FIG. 21 is a schematic view showing a second modified example of positional relationship among respective components in an amplifier; and FIG. 22 is a schematic view showing a third modified example of positional relationship among respective components in an amplifier.

DETAILED DESCRIPTION OF THE EMBODIMENTS

An embodiment is explained hereunder with reference to the drawings. Here, in the following explanations, the directions of top, bottom, left, right, front, and rear are appropriately used in the respective drawings in some cases for convenience in explaining the configurations of a motor and others but that does not limit positional relationship among respective components including a motor and others. Note that, in the present embodiment, the front-rear direction indicates a rotation axis direction of the shaft of a rotating electric machine, the top-bottom direction indicates a vertical direction, and the left-right direction indicates a direction perpendicular to both the axis direction and the vertical direction.

1. General Configuration of Motor

Firstly, an exemplary general configuration of a motor related to an embodiment will be explained with reference to FIG. 1.

As shown in FIG. 1, a motor 1 of the present embodiment has a motor part 2, a brake 3, an encoder 4, and an amplifier 10. Specifically, the motor 1 is configured as an amplifier-integrated motor with a brake and an encoder.

The motor part 2 has a stator and a rotor (those not shown in the figure) and is a motor of a rotary type in which the rotor rotates relative to the stator. The motor part 2 outputs a torque by rotating a shaft SH around an axis AX. Here, a "rotation axis direction" is the direction of the axis AX in this description and indicates the front-rear direction in this example. Furthermore, the side on which a torque of the motor part 2 outputs, namely the side on which the shaft SH protrudes from the motor part 2 (front side in the example), is called a "load side" and the other side (rear side in the example) is called an "opposite load side".

The brake 3 is arranged on the opposite load side (rear side) of the motor part 2. The brake 3 controls the braking of the shaft SH.

The encoder 4 is arranged on the opposite load side (rear side) of the brake 3. The encoder 4 detects the position of the shaft SH (also called a "rotational position", a "rotation angle", and the like) and outputs positional data representing the position.

The amplifier 10 is arranged on the opposite load side (rear side) of the encoder 4. The amplifier 10 supplies an electric power to the motor part 2. On this occasion, the amplifier 10 acquires positional data from the encoder 4, controls electric current, voltage, or the like applied to the motor part 2 on the basis of the positional data, and thereby controls the operation of the motor part 2. Further, the amplifier 10 also can acquire a master control signal from a master controller (not shown in the figure) and control the operation of the motor part 2 so as to output a torque capable of achieving the position or the like represented by the master control signal from the shaft SH.

Here, the configuration of the motor 1 explained above is an example and the present disclosure is not limited to the configuration. For example, the brake 3 and the encoder 4 may be arranged on the load side of the motor part 2. Further, the amplifier 10 may be arranged between the motor part 2 and the brake 3 or between the brake 3 and the encoder 4. Furthermore, the motor 1 may be configured so as not to have the break 3 and the encoder 4.

1 Configuration of Amplifier

An exemplary configuration of the amplifier 10 is explained hereunder with reference to FIGS. 2 to 4.

As shown in FIGS. 2 and 3, the amplifier 10 has a main body frame 6 (an exemplary first frame), a heat dissipation frame 7 (an exemplary second frame), and a heat sink 8.

The main body frame 6 has the shape of a nearly rectangular parallelepiped and constitutes a housing of the amplifier 10. The main body frame 6 has openings, out of the six faces 6a-6f located at the front, rear, left, right, top, and bottom respectively, at the four faces of the front face 6a and the rear face 6b located in the rotation axis direction and the right face 6d and the bottom face 6f located in the direction perpendicular to the rotation axis direction, for example. A connector C61 to which an I/O cable not shown in the figures is connected, connectors C62 and C63 to which communication cables are connected, and a connector C64 to which a power source cable is connected are disposed on the top face 6e (an exemplary third face) of the main body frame 6. The connectors C61-C64 are attached to the top face 6e so as to penetrate therethrough.

(2-1. Arrangement of Substrates)

As shown in FIGS. 2 and 3, a plurality of substrates 5a, 5b, 5c, 5d, 5e, 5f, 5g, and 5h is housed in the interior of the main body frame 6. The substrates 5a-5e are: arranged in a posture in which each face direction extends along the rotation axis direction; and also juxtaposed in a direction perpendicular to the rotation axis direction (left-right direction in the example) so as to be parallel to each other. The substrates 5a-5e are arranged in the order of the substrates 5a, 5b, 5c, 5d, and 5e from the right toward the left.

The substrate 5f is arranged above the substrates 5c-5e in a posture perpendicular to the substrates 5a-5e (a posture in which the face direction is perpendicular to the top-bottom direction in the example). The substrate 5g is arranged on the rear side of the substrates 5a-5f and 5h in a posture perpendicular to the substrates 5a-5e (a posture in which the face direction is perpendicular to the front-rear direction in the example). The substrate 5h is arranged above the substrate 5f in a posture parallel to the substrate 5f.

(2-2. Configuration of Heat Dissipation Frame Unit)

As shown in FIG. 2, the substrates 5c-5f are attached to the heat dissipation frame 7 and assembled to the main body frame 6 as a heat dissipation frame unit 30. The heat dissipation frame 7 includes a material of high heat conductivity such as a metal (aluminum, for example) and is dissipated the heat of the substrates 5b-5e efficiently. The heat dissipation frame 7 has a base 11 of a nearly rectangular shape attached to the bottom face 6f of the main body frame 6 and a substrate attachment member 12 erected from the base 11. The substrate attachment member 12: has two tabular attachment boards 13a and 13b juxtaposed in the left-right direction in parallel and a top board 14 joining the top ends of the attachment boards 13a and 13b; and is formed into a frame body shape. The front side of the top board 14 is cut so as to form a rectangular opening 14a. The position of the substrate attachment member 12 in the left-right direction is selected appropriately in accordance with substrate arrangement but the distance between the attachment board 13a and the right end of the base 11 is set so as to be larger than the distance between the attachment board 13b and the left end of the base 11 in FIG. 2.

As shown in FIG. 2, the heat dissipation frame unit 30 is inserted from an opening 6f1 in the bottom face 6f of the main body frame 6 and fixed to the bottom face 6f with a bolt not shown in the figure. As a result, the heat dissipation frame 7 is arranged at a face of the main body frame 6 located in the direction perpendicular to the rotation axis direction, at the bottom face 6f (an exemplary first face) located downward in this example.

As shown in FIG. 3, the substrate 5c is attached to a substrate attachment face 13a1 that is the left side face of the attachment board 13a and the top end protrudes upward from the opening 14a of the top board 14. The substrate 5c is fixed to the attachment board 13a with a bolt not shown in the figure so that a mounted electronic component Qc may touch the substrate attachment face 13a1 via an insulating heat conductive sheet 16c. A connector Cc1 is disposed on the top end of the substrate 5c and connected to a connector Cf2 of the substrate 5f.

The substrate 5d is attached to a substrate attachment face 13b1 that is the right side face of the attachment board 13b and the top end protrudes upward from the opening 14a of the top board 14. The substrate 5d is fixed to the attachment board 13b with a bolt not shown in the figure so that a mounted electronic component Qd may touch the substrate attachment face 13b1 via an insulating heat conductive sheet 16d. A connector Cd1 is disposed on the top end of the substrate 5d and connected to the connector C64 to which a power source cable is connected.

The substrate 5e is attached to a substrate attachment face 13b2 that is the left side face of the attachment board 13b and the top end protrudes upward from the top board 14. The substrate 5e is fixed to the attachment board 13b with a bolt not shown in the figure so that a mounted electronic component Qe may touch the substrate attachment face 13b2 via an insulating heat conductive sheet 16e. A connector Ce is disposed on the top end of the substrate 5e and connected to a connector Cf5 of the substrate 5f.

The substrate 5f is arranged above the substrates 5c-5e. The connectors Cf2, Cf4 (not shown in FIG. 3, refer to FIG. 4), and Cf5 are disposed on the bottom face of the substrate 5f. The substrate 5f is attached to the substrate attachment member 12 with the connectors Cf2, Cf4, and Cf5 being connected to the connectors Cc1, Cd2 (not shown in FIG. 3, refer to FIG. 4), and Ce and being supported by the substrates 5c, 5d, and 5e via the connectors. Further, a connector Cf1 is disposed on the bottom face (may also be the top face) of the substrate 5f and connected to a connector Cb1 of the substrate 5b.

With the configuration, the substrate attachment member 12 has a plurality of the substrate attachment faces 13a1, 13b1, and 13b2 and they have a positional relationship of being parallel to each other. Here, although the top board 14 of the substrate attachment member 12 is installed with the aim of improving strength and no substrate is attached in the present embodiment, in the case that the heat generation amount of the substrate 5f is large, for example, the substrate 5f may touch the top board 14 via an insulating heat conductive sheet. On this occasion, the top face 14a of the top board 14 constitutes a substrate attachment face and the substrate attachment face 14a and the substrate attachment faces 13a1, 13b1, and 13b2 have a positional relationship of being perpendicular to each other. On this occasion, the heat of the substrates having different arrangement directions can be dissipated the heat efficiently.

Further, although the substrates 5c-5e are fixed to the heat dissipation frame 7 with bolts in the above, they may be fixed not with the bolts but with fixtures such as resin-made pallets, for example.

(2-3. Configuration of Heat Sink Unit)

As shown in FIGS. 2 and 3, the substrates 5a and 5b are attached to the heat sink 8 and assembled to the main body frame 6 as a heat sink unit 20.

The heat sink unit 20 is configured by stacking the heat sink 8, the substrates 5a and 5b, an insulating heat conductive sheet 16a, a plurality of power elements 17 (an exemplary switching elements), and a resin support 18.

The heat sink 8 includes a nearly rectangular base 8a and a plurality of fins 8b erected from the right side face of the base 8a. In this example, the plurality of fins 8b is juxtaposed in the top-bottom direction in parallel and each of the fins 8b extends along the front-rear direction. Here, the heat sink 8 may be configured so as not to have the fins 8b. In the present description, a heat dissipation component not having a fin but including only a base is also included in a "heat sink".

As shown in FIG. 2, each of the power elements 17 has an element main body 17a and a plurality of lead terminals 17b. The element main body 17a is housed in a hole 18a disposed to the resin support 18. The hole 18a is used for positioning the power element to be mounted and hence may be not a hole but a recess. Each of the lead terminals 17b is connected to a terminal hole, not shown in the figure, of the substrate 5a by soldering. The substrate 5a is fixed to the heat sink 8 with the resin support 18 and the insulating heat conductive sheet 16a interposed with a plurality of screws S1. The screws S1 are inserted into a plurality of through holes 5a1 disposed to the periphery of the substrate 5a and fastened to a plurality of screw holes, not shown in the figure, of the base 8a in the heat sink 8. As a result, the substrate 5a presses the power elements 17 through the resin support 18 and the element main bodies 17a of the power elements 17 are press-contacted to the base 8a through the heat conductive sheet 16a.

As shown in FIG. 3, the substrates 5a and 5b are connected mechanically to each other with a connector not shown in the figure and connected electrically to each other with a plurality of pin terminals P (not shown in FIG. 2). As a result, the heat sink 8, the heat conductive sheet 16a, the plurality of power elements 17, the resin support 18, and the substrates 5a and 5b are assembled as the heat sink unit 20.

As shown in FIG. 2, the assembled heat sink unit 20 is inserted from an opening 6d1 having a stepped part in the right face 6d of the main body frame 6 and fixed to the right face 6d with a bolt not shown in the figure in the state where at least a part of the base 8a of the heat sink 8 is housed in the opening 6d1. As a result, the heat sink 8 is arranged at a face, different from the bottom face 6f, of the main body frame 6, in this example at the right face 6d (an exemplary second face).

As shown in FIG. 3, in the substrate 5b of the heat sink unit 20 fixed to the main body frame 6, a mounted electronic component Qb touches a substrate attachment face 13a2 that is a right side face of the attachment board 13a of the heat dissipation frame 7 via an insulating heat conductive sheet 16b. The connector Cb1 is disposed to the top end of the substrate 5b and connected to the connector Cf1 of the substrate 5f.

(2-4. Other Configurations)

As shown in FIG. 2, the substrate 5g is inserted from an opening 6b1 in the rear face 6b of the main body frame 6 and fixed to the main body frame 6 on the rear side of the heat sink unit 20 and the heat dissipation frame unit 30 with a bolt not shown in the figure. Connectors Cg1 and Cg2 (refer to FIG. 4) are disposed on the substrate 5g and connected to a connector Cd3 (refer to FIG. 4) of the substrate 5d and a connector Cp (refer to FIG. 4) of the substrate 5a, respectively. A rear cover 24 is fixed to the opening 6b1 of the main body frame 6 with a bolt not shown in the figure and the opening 6b1 is closed.

As shown in FIG. 3, the substrate 5h is fixed to the inner face side of the top face 6e of the main body frame 6 via a spacer 26 with a bolt not shown in the figure. The substrate 5h is arranged so that at least a part of it may face the base 11 of the heat dissipation frame 7 and the substrate 5f in parallel thereto. Inserts Ch1 and Ch2 and the like of the connectors C61 and C62 and the like erect from the top face of the substrate 5h and are attached to housings Ch11 and Ch22 and the like corresponding to the inserts and the like at the top face 6e of the main body frame 6. Further, a connector Ch3 (not shown in FIG. 3, refer to FIG. 4) is disposed on the bottom face of the substrate 5h and connected to a connector Cf6 (not shown in FIG. 3, refer to FIG. 4) of the substrate 5f.

(2-5. Concrete Examples of Substrates and Connection Relationship Among Respective Substrates)

The concrete examples of substrates 5a-5h and an exemplary connection relationship among the respective substrates are explained hereunder with reference to FIG. 4.

As shown in FIG. 4, an amplifier 10 converts direct-current power inputted from a main power source (not shown in the figure) into alternating-current power (three-phase alternating-current power in this example) and supplies it to the motor part 2.

The substrate 5d is a DC input substrate having components constituting a DC input circuit 50d. The substrate 5d is appropriately referred to as a "DC input substrate 5d" hereunder. Three connectors Cd1, Cd2, and Cd3 are disposed on the DC input substrate 5d. Direct-current power is inputted to the DC input circuit 50d from the main power source.

The substrate 5g is a power wiring substrate in which high-voltage wires to supply the direct-current power inputted from the DC input circuit 50d to an inverter circuit 50a in a power substrate 5a, which are described below, are disposed. The substrate 5g is appropriately referred to as a "power wiring substrate 5g" hereunder. Connectors Cg1, Cg2, Cg3, and Cg4 are disposed on the power wiring substrate 5g.

The substrate 5a is a power substrate having a component including a plurality of power elements 17 constituting an inverter circuit 50a (an exemplary power conversion circuit). The substrate 5a is appropriately referred to as a "power substrate 5a" hereunder. A plurality of pin terminals P (refer to FIG. 3) is disposed on the power substrate 5a. Further, the power substrate 5a is connected to the DC input substrate 5d via the power wiring substrate 5g and connected to the motor part 2 through a power cable EC1. The inverter circuit 50a converts the direct-current power inputted from the DC input circuit 50d via the power wiring substrate 5g into a three-phase alternating-current power by the power elements 17 and the like and supplies it to the motor part 2 through the power cable EC1.

The substrate 5b is a gate substrate having a component constituting a gate circuit 50b (an exemplary drive circuit). The substrate 5b is appropriately referred to as a "gate substrate 5b" hereunder. A connector Cb1 is disposed on the gate substrate 5b (refer also to FIG. 3). The gate circuit 50b outputs a gate signal to the inverter circuit 50a and controls the drive of the power elements 17.

The substrate 5e is a control substrate having a component constituting a control circuit 50e. The substrate 5e is appropriately referred to as a "control substrate 5e" hereunder. A connector Ce is disposed on the control substrate 5e (refer also to FIG. 3). The control circuit 50e controls a main circuit via the gate substrate 5b. Further, positional data are inputted from the encoder 4 to the control circuit 50e.

The substrate 5c is a power source substrate having a component constituting a power source circuit 50c. The substrate 5c is appropriately referred to as a "power source substrate 5c" hereunder. Connectors Cc1 and Cc2 are disposed on the power source substrate 5c (refer also to FIG. 3). The power source circuit 50c generates electric power for control from an externally supplied power source (not shown in the figure) and supplies it to the gate circuit 50b and the control circuit 50e and others.

The substrate 5h is a connector reception substrate electrically connected to connectors C61-C63 of the main body frame 6. The substrate 5h is appropriately referred to as a "connector reception substrate 5h" hereunder. A connector Ch3 is disposed on the connector reception substrate 5h. Here, a connector C64 of the main body frame 6 to which a power source cable is connected is connected to the connector Cd1 of the DC input substrate 5d without via the connector reception substrate 5h.

A plurality of connectors including the connectors Cf1, Cf2, Cf4, Cf5, and Cf6 is disposed on a control wiring substrate 5f (refer also to FIG. 3).

The connector Cb1 on the gate substrate 5b is connected to the connector Cf1 on the control wiring substrate 5f. The connector Cc1 on the power source substrate 5c is connected to the connector Cf2 on the control wiring substrate 5f. The connector Cd2 on the DC input substrate 5d is connected to the connector Cf4 on the control wiring substrate 5f and the connector Cd3 on the DC input substrate 5d is connected to the connector Cg1 on the power wiring substrate 5g. The connector Ce on the control substrate 5e is connected to the connector Cf5 on the control wiring substrate 5f. The connector Ch3 on the connector reception substrate 5h is connected to the connector Cf6 on the control wiring substrate 5f. As a result, the gate substrate 5b and the control substrate 5e, the power source substrate 5c and the control substrate 5e, the DC input substrate 5d and the control substrate 5e, and the connector reception substrate 5h and the control substrate 5e are electrically connected to each other via the control wiring substrate 5f, respectively. Further, the gate substrate 5b and the power source substrate 5c are electrically connected to each other via the power wiring substrate 5g.

Here, each of the types of the substrates 5a-5h and others explained above and the connection relationship among the respective substrates is one example and contents other than the above may also be acceptable.

3. Producing Method for Motor

An exemplary producing method for a motor 1 is explained hereunder with reference to FIG. 5.

As shown in FIG. 5, in a producing process according to the producing method for the motor 1, prior to a main process (or in parallel to a main process), a substrate assembling process of assembling a power source substrate 5c, a DC input substrate 5d, a control substrate 5e, and a control wiring substrate 5f to a heat dissipation frame 7 and a substrate assembling process of assembling a power substrate 5a and a gate substrate 5b to a heat sink 8 are carried out.

In the substrate assembling process to the heat dissipation frame 7, the power source substrate 5c is attached to a substrate attachment face 13a1 of an attachment board 13a in a substrate attachment member 12 of the heat dissipation frame 7 via an insulating heat conductive sheet 16c. Further, the DC input substrate 5d is attached to a substrate attachment face 13b1 of an attachment board 13b in the heat dissipation frame 7 via an insulating heat conductive sheet 16d. Furthermore, the control substrate 5e is attached to a substrate attachment face 13b2 of the attachment board 13b via an insulating heat conductive sheet 16e. In addition, the control wiring substrate 5f is arranged above the power source substrate 5c, the DC input substrate 5d, and the control substrate 5e and connectors Cc1, Cd2, and Ce of the substrates 5c, 5d, and 5e are connected to connectors Cf2, Cf4, and Cf5 of the control wiring substrate 5f, respectively. As a result, a heat dissipation frame unit 30 is completed.

In the substrate assembling process to the heat sink 8, each of power elements 17 is housed in a hole 18a of a resin support 18 and a lead terminal 17b of the power element 17 is inserted into a terminal hole of the power substrate 5a and connected by soldering or the like. The power substrate 5a to which the power elements 17 are attached is fixed to a base 8a of the heat sink 8 with the resin support 18 and an insulating heat conductive sheet 16a interposed with screws S1. Subsequently, the gate substrate 5b is attached to the power substrate 5a and a heat sink unit 20 is completed.

In the main process, firstly a connector reception substrate 5h is inserted into a main body frame 6 and assembled to the main body frame 6. In the connector reception substrate 5h, inserts Ch1 and Ch2 and the like are attached to housings Ch11 and Ch22 and the like at a top face 6e of the main body frame 6 and fixed to the inner face side of the top face 6e via a spacer 26 with a bolt.

Successively, the heat dissipation frame unit 30 is assembled to the main body frame 6. Specifically, a base 11 of the heat dissipation frame 7 is fixed to an opening 6f1 in a bottom face 6f of the main body frame 6 with a bolt. As a result, the heat dissipation frame 7 is arranged at the bottom face 6f of the main body frame 6.

Successively, the heat sink unit 20 is assembled to the main body frame 6. Specifically, the base 8a of the heat sink 8 is fixed to an opening 6d1 in a right face 6d of the main body frame 6 with a bolt. On this occasion, the gate substrate 5b is brought into contact with a substrate attachment face 13a2 of an attachment board 13a in the main body frame 6 via an insulating heat conductive sheet 16b. Further, a connector Cb1 of the gate substrate 5b is connected to a connector Cf1 of the control wiring substrate 5f.

Successively, a power wiring substrate 5g is inserted from an opening 6b1 in a rear face 6b of the main body frame 6 and fixed to the main body frame 6 with a bolt. On this occasion, connectors Cg1 and Cg2 of the power wiring substrate 5g are connected to a connector Cd3 of the DC input substrate 5d and a connector Cp of the power substrate 5a, respectively.

Successively, a rear cover 24 is assembled so as to close the opening 6b1 in the rear face 6b of the main body frame 6. As a result, an amplifier 10 is completed.

Then, the amplifier 10 is assembled on the opposite load side of an encoder 4. As a result, the motor 1 having a motor part 2, a brake 3, the encoder 4, and the amplifier 10 is completed.

Here, the respective processes according to the producing method for the motor 1 explained above are carried out automatically through one or more producing apparatuses. The processes, however, may be carried out partially manually.

Further, the producing processes of the motor 1 explained above are examples and a process other than the above may be included or the processes may be excluded partially. Furthermore, the sequence of the processes may be changed appropriately. For example, the order of the assembly of the heat dissipation frame unit 30 and the assembly of the heat sink unit 20 may be reversed.

In the above, the left face 6c, the right face 6d, the top face 6e, and the bottom face 6f of the main body frame 6 correspond to examples of the faces located in a direction perpendicular to the rotation axis direction of a rotor in the frame and the heat dissipation frame 7 and the heat sink 8 correspond to an exemplary configuration of means for dissipating the heat of at least a substrate housed in the frame.

4. Effects of Embodiment

As explained above, in the motor 1 of the present embodiment, the amplifier 10 has: the main body frame 6 constituting a housing of the amplifier 10; and the heat dissipation frame 7 which is arranged at a bottom face 6f of the main body frame 6 located in a direction perpendicular to a rotation axis direction and to which substrates 5c, 5d, 5e, and 5f housed in the main body frame 6 are attached. As a result, following effects are exhibited.

That is, in the present embodiment, the heat dissipation frame 7 to which the substrates 5c-5f are attached is configured as a frame different from the main body frame 6 constituting a housing of the amplifier 10. As a result, the structure of the heat dissipation frame 7 can be optimized from the viewpoint of heat dissipation performance and hence the heat of the substrates 5c-5e can be transferred to and dissipated from the heat dissipation frame 7 efficiently. Consequently, the heat dissipation performance of the amplifier 10 can be enhanced.

Further, the heat dissipation frame 7 is arranged at a face (bottom face 60, of the main body frame 6, located in a direction perpendicular to the rotation axis direction. As a result, whereas a heat dissipation face is limited to a single direction (the rear direction) in the case of dissipating heat from a face (rear face 6b) located in the rotation axis direction, for example, the direction of a heat dissipation face can be selected from a plurality of directions such as a top-bottom direction, and a left-right direction, in the present embodiment. Consequently, the degree of freedom in design can be improved.

Furthermore, in the present embodiment in particular, the amplifier 10: is arranged at a right face 6d different from the bottom face 6f of the main body frame 6; and has a heat sink 8 to which substrates 5a and 5b different from the substrates 5c-5f, which are housed in the main body frame 6, are attached. As a result, the following effects are exhibited.

That is, in the present embodiment, the heat of the respective substrates and power elements 17 that are heat-generating components can be dissipated from a plurality of heat dissipation faces having different directions by the heat dissipation frame 7 arranged at the bottom face 6f and the heat sink 8 arranged at the right face 6d of the main body frame 6. Specifically, the heat of the substrates 5b-5e can be dissipated downward through the heat dissipation frame 7 and the heat of the power elements 17 can be dissipated rightward through the heat sink 8. Consequently, the heat dissipation performance of the amplifier 10 can be enhanced further.

Furthermore, in the present embodiment in particular, the amplifier 10 has connectors C61, C62, C63, and C64 arranged at a top face 6e different from the bottom face 6f and the right face 6d of the main body frame 6.

As a result, various cables (a power source cable, a communication cable, an I/O cable, and other cables) can be connected to a face other than the heat dissipation faces of the main body frame 6 in the amplifier 10 through the connectors C61-C64 without hindering the heat dissipation performance.

Furthermore, in the present embodiment in particular, the heat dissipation frame 7 has: a base 11 attached to the bottom face 6f of the main body frame 6; and a substrate attachment member 12 which is erected from the base 11 and to which the substrates 5c-5f are attached.

As a result, the attachment work of the substrates to the heat dissipation frame 7 can be facilitated. Further, the heat of the substrates 5c-5e can be transferred to and dissipated efficiently at the substrate attachment member 12 and the base 11. Consequently, the heat dissipation performance of the amplifier 10 can be enhanced.

Furthermore, in the present embodiment in particular, the substrate attachment member 12 has a plurality of substrate attachment faces 13a1, 13b1, and 13b2. As a result, a plurality of the substrates 5c-5e can be attached to the heat dissipation frame 7 and hence the heat of the substrates 5c-5e can be dissipated efficiently. Further, by fixing the respective substrates 5c-5e to the heat dissipation frame 7, the fixation structures of the substrates 5c-5e can be robust and the reliability of the connection among the substrates 5c-5e can be improved. Furthermore, the assembling performance of a motor can be improved by unitizing the plurality of substrates.

Furthermore, in the present embodiment in particular, a plurality of the substrate attachment faces 13a1, 13b1, and 13b2 of the substrate attachment member 12 is parallel to each other. As a result, substrates can be attached to both the front and rear faces of each of tabular attachment boards 13a and 13b and hence a larger number of substrates can be attached to the heat dissipation frame 7 efficiently. Further, the substrates 5c-5e attached to the substrate attachment member 12 are arranged so that the face directions may be parallel to each other along the rotation axis direction and hence the influence to a heat dissipation area when the motor 1 is downsized in the radial direction can be reduced and further downsizing can be attained.

Furthermore, in the present embodiment in particular, the amplifier 10 has the connector reception substrate 5h, which is housed in the main body frame 6 and to which connectors C61 and C62 and the like are electrically connected, and at least a part of the connector reception substrate 5h is arranged so as to face the base 11 of the heat dissipation frame 7. As a result, the following effects are exhibited.

That is, by disposing the connector reception substrate 5h, the various cables connected to the connectors C61 and C62 and the like can be connected to the control substrate 5e and others in the amplifier 10 with not lead wires but connectors and hence the wiring in the amplifier 10 can be saved and the assembling performance can be improved. Further, with the arrangement configuration, the heat dissipation frame 7 is inserted in a direction facing the connector reception substrate 5h during the assembly of a motor. As a result, the connector reception substrate 5h can be connected to the control wiring substrate 5f and others attached to the heat dissipation frame 7 with not lead wires but connectors and hence the wiring can be saved and the assembling performance can be improved accordingly.

Furthermore, in the present embodiment in particular, the amplifier 10 has a power substrate 5a in which a plurality of power elements 17 constituting an inverter circuit 50a is arranged and a gate substrate 5b in which a gate circuit 50b to drive the power elements 17 is arranged and the power substrate 5a and the gate substrate 5b are arranged between the heat sink 8 and the substrate attachment member 12 of the heat dissipation frame 7.

As a result, the power elements 17 of relatively large heat generation amount can be cooled by the heat sink 8 and the gate substrate 5b can be cooled by the heat dissipation frame 7 efficiently.

Furthermore, in the present embodiment in particular, the amplifier 10 has an insulating heat conductive sheet 16b arranged between the gate substrate 5b and the substrate attachment member 12 and the gate substrate 5b is arranged so as to touch the attachment board 13a of the substrate attachment member 12 via the heat conductive sheet 16b.

As a result, the heat of the gate substrate 5b can be dissipated efficiently while the insulation between the gate substrate 5b and the substrate attachment member 12 is secured.

Further, the producing method for a motor 1 of the present embodiment includes: attaching a power source substrate 5c, a DC input substrate 5d, a control substrate 5e, and a control wiring substrate 5f, which are housed in the main body frame 6, to the heat dissipation frame 7; and attaching the heat dissipation frame 7 to which the substrates 5c-5f are attached to the bottom face 6f, of the main body frame 6, located in a direction perpendicular to the rotation axis direction. As a result, the following effects are exhibited.

That is, the power source substrate 5c, the DC input substrate 5d, the control substrate 5e, and the control wiring substrate 5f, which are attached to the heat dissipation frame 7, can be assembled to the main body frame 6 simultaneously and hence the assembling work can be facilitated. Further, when the substrates 5c-5f are attached to the heat dissipation frame 7, necessary connectors among the substrates can be connected beforehand and the substrates can be attached with necessary distances between the substrates (insulation distances) secured beforehand and hence the succeeding assembling work can be facilitated. Consequently, the assembling performance of the motor 1 can be improved.

Furthermore, the producing method for the motor 1 of the present embodiment includes: attaching the power substrate 5a and the gate substrate 5b, which are housed in the main body frame 6, to the heat sink 8; and attaching the heat sink 8 to which the substrates 5a and 5b are attached to the right face 6d of the main body frame 6. As a result, the following effects are exhibited.

That is, the power substrate 5a and the gate substrate 5b, which are attached to the heat sink 8, can be assembled to the main body frame 6 simultaneously and hence the assembling work can be facilitated. Further, when the substrates 5a and 5b are attached to the heat sink 8, necessary connectors between the substrates can be connected beforehand and the substrates can be attached with necessary distances between the substrates (insulation distances) secured beforehand and hence the succeeding assembling work can be facilitated. Consequently, the assembling performance of the motor 1 can be improved.

5. Modified Examples

Here, the disclosed embodiment is not limited to the above and various modifications are acceptable within the range not departing from the gist and the technical idea. Such modified examples are explained hereunder.

(5-1. Variation of Configuration of Heat Dissipation Frame)

The variation of the configuration of a heat dissipation frame 7 is explained with reference to FIGS. 6 to 15. Here, in FIGS. 6 to 15, the components other than a heat dissipation frame 7 and the like, a heat sink 8, and substrates 5a-5e are excluded from the figures.

FIG. 6 is a schematic view showing the configuration of a heat dissipation frame 7 related to the embodiment. Firstly the configuration of the heat dissipation frame 7 is explained for comparison with the modified examples shown in FIG. 7 and the succeeding figures.

As shown in FIG. 6, the heat dissipation frame 7 has a base 11 and a substrate attachment member 12 erected from the base 11. The substrate attachment member 12 has two attachment boards 13a and 13b juxtaposed in the left-right direction and a top board 14 joining the top ends of the attachment boards 13a and 13b. An opening 14a is formed on the front side of the top board 14.

A power substrate 5a is arranged in the vicinity of a heat sink 8, a gate substrate 5b is arranged in the vicinity of the right side of the attachment board 13a, a power source substrate 5c is arranged in the vicinity of the left side of the attachment board 13a, a DC input substrate 5d is arranged in the vicinity of the right side of the attachment board 13b, and a control substrate 5e is arranged in the vicinity of the left side of the attachment board 13b.

As a result, the heat of the power substrate 5a (the heat of power elements 17, the same shall apply hereinafter) is dissipated from the heat sink 8. The heat of the gate substrate 5b and the power source substrate 5c is transferred to the attachment board 13a and dissipated from the base 11. The heat of the DC input substrate 5d and the control substrate 5e is transferred to the attachment board 13b and dissipated from the base 11.

(5-1-1. First Modified Example of Heat Dissipation Frame)

FIG. 7 is a schematic view showing a first modified example of a heat dissipation frame. As shown in FIG. 7, in a heat dissipation frame 7a of the first modified example, a substrate attachment member 12 further has a tabular attachment board 15a erected from a base 11 between an attachment board 13a and a heat sink 8 in addition to the attachment boards 13a and 13b and a top board 14. A power substrate 5a is arranged between the attachment board 15a and the heat sink 8 and a gate substrate 5b is arranged between the attachment board 15a and the attachment board 13a. The other configuration of the heat dissipation frame 7a is similar to that of the heat dissipation frame 7 in FIG. 6.

As a result, the heat of the power substrate 5a is dissipated from the heat sink 8, also transferred to the attachment board 15a, and dissipated from the base 11. The heat of the gate substrate 5b is transferred to the attachment boards 13a and 15a and dissipated from the base 11. The heat dissipation of a power source substrate 5c, a DC input substrate 5d, and a control substrate 5e is similar to that of the heat dissipation frame 7 in FIG. 6. Here, the heat dissipation routes are an example and the respective substrates may be arranged so as to form other heat dissipation routes.

The first modified example (second, third, fifth, and seventh modified examples and the like which will be described later are the same) is effective: in the case of adding a substrate other than the substrates 5a-5e by the addition of another function or the like; or in the case of adding a heat-generating component such as an RC snubber circuit to the power substrate 5a and increasing a heat generation amount, for example. In this way, the number of the attachment boards may be changed depending on the number of substrates, the heat generation amount, and others.

(5-1-2. Second Modified Example of Heat Dissipation Frame)

FIG. 8 is a schematic view showing a second modified example of a heat dissipation frame. As shown in FIG. 8, in a heat dissipation frame 7b of the second modified example, a substrate attachment member 12 further has two attachment boards 15b and 15c erected from a base 11 between an attachment board 13a and a heat sink 8 in addition to the attachment boards 13a and 13b and a top board 14. A power substrate 5a is arranged between the attachment board 15c and the heat sink 8 and a gate substrate 5b is arranged between the attachment board 15b and the attachment board 13a. The other configuration of the heat dissipation frame 7b is similar to that of the heat dissipation frame 7 in FIG. 6.

As a result, the heat of the power substrate 5a is dissipated from the heat sink 8, also transferred to the attachment board 15c, and dissipated from the base 11. The heat of the gate substrate 5b is transferred to the attachment boards 13a and 15b and dissipated from the base 11. The heat dissipation of a power source substrate 5c, a DC input substrate 5d, and a control substrate 5e is similar to that of the heat dissipation frame 7 in FIG. 6. Here, the heat dissipation routes are an example and the respective substrates may be arranged so as to form other heat dissipation routes.

(5-1-3. Third Modified Example of Heat Dissipation Frame)

FIG. 9 is a schematic view showing a third modified example of a heat dissipation frame. As shown in FIG. 9, in a heat dissipation frame 7c of the third modified example, the attachment board 15b' in which the length in the top-bottom direction is shortened is disposed in place of the attachment board 15b of the heat dissipation frame 7b in FIG. 8. Other configuration of the heat dissipation frame 7c is similar to that of the heat dissipation frame 7b in FIG. 8.

The heat dissipation routes of the respective substrates in the third modified example are similar to those of the second modified example. The third modified example is effective in the case of mounting a heat generating component at the lower part of the surface of a gate substrate 5b on the right side, for example, and the configuration of the heat dissipation frame 7c can be minimized. In this way, the length of each attachment board may be changed depending on the position of a heat generating component in a substrate, a heat generation amount, and others.

(5-1-4. Fourth Modified Example of Heat Dissipation Frame)

FIG. 10 is a schematic view showing a fourth modified example of a heat dissipation frame. As shown in FIG. 10, in a heat dissipation frame 7d of the fourth modified example, the top board 14 of the heat dissipation frame 7 in FIG. 6 is removed. Other configuration of the heat dissipation frame 7d is similar to that of the heat dissipation frame 7 in FIG. 6.

The heat dissipation routes of respective substrates in the fourth modified example are similar to those of the heat dissipation frame 7 in FIG. 6.

(5-1-5. Fifth Modified Example of Heat Dissipation Frame)

FIG. 11 is a schematic view showing a fifth modified example of a heat dissipation frame. As shown in FIG. 11, in a heat dissipation frame 7e of the fifth modified example, the top board 14 of the heat dissipation frame 7 in FIG. 6 is removed and a substrate attachment member 12 further has an attachment board 15a between an attachment board 13a and a heat sink 8. Other configuration of the heat dissipation frame 7e is similar to that of the heat dissipation frame 7 in FIG. 6.

The heat dissipation routes of respective substrates in the fifth modified example are similar to those of the heat dissipation frame 7a in FIG. 7.

(5-1-6. Sixth Modified Example of Heat Dissipation Frame)

FIG. 12 is a schematic view showing a sixth modified example of a heat dissipation frame. As shown in FIG. 12, in a heat dissipation frame 7f of the sixth modified example, the attachment board 13a and the top board 14 of the heat dissipation frame 7 in FIG. 6 are removed. Other configuration of the heat dissipation frame 7f is similar to that of the heat dissipation frame 7 in FIG. 6.

In the sixth modified example, with regard to a gate substrate 5b and a power source substrate 5c, heat is not dissipated from the heat dissipation frame 7f. The heat dissipation of a power substrate 5a, a DC input substrate 5d, and a control substrate 5e is similar to that of the heat dissipation frame 7 in FIG. 6. As a result, the sixth modified example is effective in the case that the heat generation amounts of the gate substrate 5b and the power source substrate 5c are small and the heat dissipation frame 7f can be downsized and lightened. Here, the position of an attachment board 13b of the heat dissipation frame 7f is not limited between the DC input substrate 5d and the control substrate 5e and can be selected appropriately.

(5-1-7. Seventh Modified Example of Heat Dissipation Frame)

FIG. 13 is a schematic view showing a seventh modified example of a heat dissipation frame. As shown in FIG. 13, in a heat dissipation frame 7g of the seventh modified example, the attachment boards 13a' and 13b' in which the length in the top-bottom direction is shortened are disposed in place of the attachment boards 13a and 13b of the heat dissipation frame 7e in FIG. 11. In the example, the attachment board 13b' is shorter in the top-bottom direction than the attachment board 13a'. Other configuration of the heat dissipation frame 7g is similar to that of the heat dissipation frame 7e in FIG. 11.

The heat dissipation routes of respective substrates in the seventh modified example are similar to those of the fifth modified example shown in FIG. 11. The seventh modified example is effective in the case of attaching heat generating components at the lower parts of the surface of a gate substrate 5b on the left side, the surface of a power source substrate 5c on the right side, the surface of a DC input substrate 5d on the left side, and the surface of a control substrate 5e on the right side, respectively, for example, and the configuration of the heat dissipation frame 7g can be minimized. In this way, the lengths of respective attachment boards may be changed depending on the positions of heat generating components in substrates, heat generation amounts, and others.

(5-1-8. Eighth Modified Example of Heat Dissipation Frame)

FIG. 14 is a schematic view showing an eighth modified example of a heat dissipation frame. As shown in FIG. 14, in a heat dissipation frame 7h of the eighth modified example, two top boards 14b and 14c divided into left and right are disposed in place of the top board 14 of the heat dissipation frame 7 in FIG. 6. Other configuration of the heat dissipation frame 7h is similar to that of the heat dissipation frame 7 in FIG. 6.

The heat dissipation routes of respective substrates in the eighth modified example are similar to those of the heat dissipation frame 7 in FIG. 6. Here, in the present modified example, the top boards 14b and 14c can also be used as substrate attachment faces for a control wiring substrate 5f and another substrate, for example.

(5-1-9. Ninth Modified Example of Heat Dissipation Frame)

FIG. 15 is a schematic view showing a ninth modified example of a heat dissipation frame. As shown in FIG. 15, in a heat dissipation frame 7i of the ninth modified example, the attachment board 13a of the heat dissipation frame 7 in FIG. 6 is not erected from the base 11 and is attached to the right end of a top board 14 with a screw 13s. Specifically, the heat dissipation frame 7i includes two components of: a component formed by integrating a base 11, an attachment board 13b erected from the base 11, and a top board 14; and an attaching board 13a.

Here, the heat dissipation frame may also include a plurality of components as another configuration. A base 11, an attachment board 13b, a top board 14, and an attachment board 13a may also be individual components, for example.

The heat dissipation routes of respective substrates in the ninth modified example are similar to those of the heat dissipation frame 7 in FIG. 6.

(5-2. Variation of Configuration of Heat Sink Unit)

The variation of the configuration of a heat sink unit 20 is explained with reference to FIGS. 16 to 18. Here, in FIGS. 16 to 18, the configuration other than a heat sink 8, a heat conductive sheet 16a, power elements 17, a resin support 18, and a power substrate 5a is excluded from the figures.

FIG. 16 is a schematic view showing the configuration of a heat sink unit 20 related to the embodiment. Firstly the configuration of the heat sink unit 20 is explained for comparison with the modified examples shown in FIGS. 17 and 18.

The heat sink unit 20 has a power substrate 5a, a resin support 18, a plurality of power elements 17, an insulating heat conductive sheet 16a, and a heat sink 8. The power elements 17 housed in the resin support 18 are pressed to the heat sink 8 via the heat conductive sheet 16a by fixing the power substrate 5a to the heat sink 8 with a plurality of bolts.

(5-2-1. Addition of Frame Connected to Heat Sink)

FIG. 17 is a schematic view showing an exemplary configuration of a heat sink unit 20A of the present modified example.

As shown in FIG. 17, in the heat sink unit 20A of the present modified example, a frame 22 connected to a heat sink 8 is added. The frame 22 has nearly an L-shape when viewed from the front-rear direction and includes a frame part 22a and a frame part 22b disposed integrally to the bottom end of the frame part 22a. The frame part 22b is fixed to the heat sink 8 with a screw not shown in the figure.

The frame part 22a includes a material having a high heat conductivity such as a metal (aluminum, for example) and touches the surface of a power substrate 5a on the left side. As a result, the heat of a power element 17 is dissipated from the heat sink 8 through a heat conductive sheet 16a and also the heat of the power substrate 5a can be dissipated from the heat sink 8 through the frame 22 and hence the heat dissipation performance of the heat sink unit 20A can be improved.

The present modified example is effective in the case of adding a heat generating component such as an RC snubber circuit to the power substrate 5a and increasing a heat generation amount or another case, for example. In this way, a frame may be added to a heat sink unit appropriately depending on a heat generation amount or the like.

(5-2-2. Change of Position of Resin Support)

The heat sink unit 20 related to the embodiment shown in FIG. 16 is configured so as to connect the power element 17 to the power substrate 5a with a lead terminal 17b and hence is configured so as to press the power element 17 to the heat sink 8 by the resin support 18. The present modified example corresponds to a case that a power element 17 is a surface-mounting type power element mounted directly over a power element 5a.

FIG. 18 is a schematic view showing an exemplary configuration of a heat sink unit 20B of the present modified example. As shown in FIG. 18, in the heat sink unit 20B, a surface-mounting type power element 17 is arranged over the surface of a power substrate 5a on the side of a heat sink 8. A resin support 18 is arranged on the opposite side of the heat sink 8 with respect to the power substrate 5a and fixed to the heat sink 8 so as to sandwich the power substrate 5a and a heat conductive sheet 16a therebetween with a screw not shown in the figure.

With the arrangement, the whole power substrate 5a is pressed to the heat sink 8 uniformly by the resin support 18. As a result, a local stress can be restrained from being generated in the power substrate 5a and hence the deformation (bending and others) of the power substrate 5a and stress to a mounted component can be restrained.

(5-3. Variation of Positional Relationship of Heat Dissipation Frame and Heat Sink)

Although the heat dissipation frame 7 is arranged on the lower side, the heat sink 8 is arranged on the right side, and the connectors C61-C64 are arranged on the upper side of the main body frame 6 in the amplifier 10 of the embodiment, the positional relationship at the main body frame 6 can be modified. Variations of positional relationship are explained with reference to FIGS. 19 to 22. Here, in FIGS. 19 to 22, the configuration other than a main body frame 6, a heat dissipation frame 7, a heat sink unit 20, connectors C61 and C62, a connector reception substrate 5h, and others is excluded from the figures.

FIG. 19 is a schematic view showing the positional relationship of respective components in an amplifier 10 related to the embodiment. Firstly the arrangement and configuration of the amplifier 10 are explained for comparison with the modified examples shown in FIG. 20 and the succeeding figures.

A connector reception substrate 5h is arranged on the inner side of a top face 6e of a main body frame 6. The connector reception substrate 5h is connected to connectors C61 and C62 and the like disposed on the top face 6e of the main body frame 6.

Substrates 5c-5f are attached to a heat dissipation frame 7 and assembled to a bottom face 6f of the main body frame 6 as a heat dissipation frame unit 30. Here, the substrates 5c-5f are excluded from the figure (the same shall apply also to FIGS. 20 to 22 described later). Substrates 5a and 5b are attached to a heat sink 8 and the heat sink 8 is assembled to a right face 6d of the main body frame 6 as a heat sink unit 20.

With the configuration, the connectors C61 and C62 and the like are arranged at the top face 6e, the heat dissipation frame 7 is arranged at the bottom face 6f, and the heat sink 8 is arranged at the right face 6d of the main body frame 6 in the amplifier 10.

(5-3-1. First Modified Example of Positional Relationship)

FIG. 20 is a schematic view showing a first modified example of positional relationship. As shown in FIG. 20, in an amplifier 10A of the first modified example, a connector reception substrate 5h1 having nearly an L-shape when viewed from a front-rear direction is housed in a main body frame 6. The connector reception substrate 5h1 has a substrate part 5ha along the inner face of a top face 6e of the main body frame 6 and a substrate part 5hb along the inner face of a right face 6d of the main body frame 6 arranged so as to face a base 11 of a heat dissipation frame 7. The substrate part 5ha is connected to connectors C61 and C62 and the like at the top face 6e. The main body frame 6 has openings at least in a left face 6c and a bottom face 6f.

A heat dissipation frame unit 30 is assembled to the left face 6c and the heat dissipation frame 7 is arranged at the left face 6c of the main body frame 6. Further, a heat sink unit 20 is assembled to the bottom face 6f and a heat sink 8 is arranged at the bottom face 6f of the main body frame 6.

In this way, by adopting an appropriate shape (nearly an L-shape in this example) for the connector reception substrate 5h1, the positional relationship among the heat dissipation frame 7, the heat sink 8, and the connectors C61 and C62 and the like can be modified while the arrangement relationship between the connector reception substrate 5h1 (the substrate part 5hb) and the heat dissipation frame 7 facing each other is retained.

(5-3-2. Second Modified Example of Positional Relationship)

FIG. 21 is a schematic view showing a second modified example of positional relationship. As shown in FIG. 21, in an amplifier 10B of the second modified example, a connector reception substrate 5h2 having nearly an L-shape when viewed from a front-rear direction is housed in a main body frame 6. The connector reception substrate 5h2 has a substrate part 5ha along the inner face of a top face 6e of the main body frame 6 and a substrate part 5he along the inner face of a left face 6c of the main body frame 6 arranged so as to face a base 11 of a heat dissipation frame 7. The substrate part 5ha is connected to connectors C61 and C62 and the like at the top face 6e. The main body frame 6 has openings at least in a right face 6d and a bottom face 6f. Further, the heat dissipation frame 7 (a heat dissipation frame unit 30) is configured by reversing the heat dissipation frame 7 (the heat dissipation frame unit 30) shown in FIG. 20 in a left-right direction.

The heat dissipation frame unit 30 is assembled to the right face 6d and the heat dissipation frame 7 is arranged at the right face 6d of the main body frame 6. Further, a heat sink unit 20 is assembled to the bottom face 6f and a heat sink 8 is arranged at the bottom face 6f of the main body frame 6.

By the present modified example too, the positional relationship among the heat dissipation frame 7, the heat sink 8, and the connectors C61 and C62 and the like can be modified while the arrangement relationship between the connector reception substrate 5h2 (the substrate part 5hc) and the heat dissipation frame 7 facing each other is retained. Here, in the present modified example, the arrangement relationship between the heat dissipation frame unit 30 and the heat sink unit 20 is opposite to the arrangement relationship shown in FIG. 19 or 20 and hence the arrangement of components mounted over respective substrates and connectors is changed appropriately (the same shall also apply to FIG. 22 described later).

(5-3-3. Third Modified Example of Positional Relationship)

FIG. 22 is a schematic view showing a third modified example of positional relationship. As shown in FIG. 22, in an amplifier 10C of the third modified example, a heat dissipation frame 7 (heat dissipation frame unit 30) is configured by reversing the heat dissipation frame 7 (heat dissipation frame unit 30) shown in FIG. 19 in a left-right direction. A connector reception substrate 5h is arranged similarly to FIG. 19. A main body frame 6 has openings at least in a left face 6c and a bottom face 6f.

A heat dissipation frame unit 30 is assembled to the bottom face 6f and a heat dissipation frame 7 is arranged at the bottom face 6f of the main body frame 6. Further, a heat sink unit 20 is assembled to the left face 6c and a heat sink 8 is arranged at the left face 6c of the main body frame 6.

By the present modified example too, the positional relationship among the heat dissipation frame 7, the heat sink 8, and connectors C61 and C62 and the like can be modified while the arrangement relationship between the connector reception substrate 5h and the heat dissipation frame 7 facing each other is retained.

According to the modified examples (the first to third modified examples) of the positional relationship explained above, the following effects are exhibited. That is, as an installation environment of a motor 1, for example, it is desirable to secure a sufficient heat dissipation space in the directions of arranging a heat sink 8 and a heat dissipation frame 7. Further, as the arrangement directions of connectors C61-C64, it is desirable to adopt arrangement conforming to the installation environment of a motor 1 and needs such as laying cable by a user.

According to the modified examples, by configuring the amplifier 10A (10B, 10C) so as to be able to change the positional relationship among the heat dissipation frame 7, the heat sink 8, and the connectors C61-C64 in the main body frame 6, the positional relationship among them can be selected depending on an installation environment and needs. As a result, a motor capable of conforming flexibly to an installation environment and needs can be realized.

It is noted that if terms "vertical," "parallel," "plane," etc. are used in the above description, these terms are not used in the exact meanings thereof. Specifically, these terms "vertical," "parallel," and "plane" allow tolerances and errors in design and producing and have meanings of "approximately vertical," "approximately parallel," and "approximately plane."

It is noted that if terms "same," "equal," "different," etc. in relation to a dimension and a size of the appearance are used in the above description, these terms are not used in the exact meaning thereof. Specifically, these terms "same," "equal," and "different" allow tolerances and errors in design and producing and have meanings of "approximately the same," "approximately equal," and "approximately different."

Techniques by the embodiment and each modified example may be appropriately combined and utilized in addition to the examples having already described above.

Although exemplification is not performed one by one, the embodiment and each modified example are carried out by various changes being applied thereto without departing from the technical idea of the present disclosure.

Obviously, numerous modifications and variations of the present disclosure are possible in light of the above teachings. It is therefore to be understood that within the scope of the appended claims, the disclosure may be practiced otherwise than as specifically described herein.

What is claimed is:

1. A motor comprising:
   a motor part comprising a stator and a rotor; and
   an amplifier configured to supply electric power to the motor part, the amplifier comprising:
      a first frame constituting a housing of the amplifier; and
      a second frame which is arranged on a first face located in a direction perpendicular to a rotation axis direction of the rotor at the first frame and to which at least one substrate housed in the first frame is attached,
   wherein the second frame comprises
      a base attached to the first face of the first frame, and
      at least one substrate attachment member which is erected from the base and to which the at least one substrate is attached.

2. The motor according to claim 1,
   wherein the amplifier comprises a heat sink which is arranged on a second face different from the first face at the first frame and to which at least another substrate different from the at least one substrate housed in the first frame is attached.

3. The motor according to claim 2,
   wherein the amplifier comprises at least one connector arranged on a third face different from the first face and the second face at the first frame.

4. The motor according to claim 3,
   wherein the amplifier is configured so as to be able to change a positional relationship among the second frame, the heat sink, and the at least one connector at the first frame.

5. The motor according to claim 1,
   wherein the substrate attachment member comprises a plurality of substrate attachment faces.

6. The motor according to claim 5,
   wherein at least two substrate attachment faces of the plurality of substrate attachment faces are perpendicular to each other.

7. The motor according to claim 5,
   wherein at least two substrate attachment faces of the plurality of substrate attachment faces are parallel to each other.

8. The motor according to claim 3,
   wherein the amplifier comprises a connector reception substrate which is housed in the first frame and to which the at least one connector is connected electrically, and
   wherein the connector reception substrate is arranged such that at least a part of the connector reception substrate faces the base of the second frame.

9. The motor according to claim 2,
   wherein the amplifier comprises
      a power substrate at which a plurality of switching elements constituting a power conversion circuit are arranged, and
      a gate substrate at which a drive circuit configured to drive the plurality of switching elements is arranged, and
   wherein the power substrate and the gate substrate are arranged between the heat sink and the substrate attachment member of the second frame.

10. The motor according to claim 9,
    wherein the amplifier comprises an insulating heat conductive sheet arranged between the gate substrate and the substrate attachment member, and
    wherein the gate substrate is arranged so as to touch the substrate attachment member via the heat conductive sheet.

11. A producing method for a motor comprising a motor part and an amplifier configured to supply electric power to the motor part, the motor part comprising a stator and a rotor, the producing method comprising:
    attaching at least one substrate housed in a first frame constituting a housing of the amplifier to a substrate attachment member of a second frame which comprises a base and at least one the substrate attachment member which is erected from the base; and
    attaching the base of the second frame to which the at least one substrate is attached to a first face located in a direction perpendicular to a rotation axis direction of the rotor at the first frame.

12. The producing method for the motor according to claim 11, further comprising:
    attaching at least another substrate different from the at least one substrate housed in the first frame to a heat sink; and
    attaching the heat sink to which the at least another substrate is attached to a second face different from the first face of the first frame.

* * * * *